US012404419B2

(12) United States Patent
Joly et al.

(10) Patent No.: US 12,404,419 B2
(45) Date of Patent: Sep. 2, 2025

(54) IMIDE ADDITION-FRAGMENTATION AGENTS

(71) Applicant: 3M INNOVATIVE PROPERTIES COMPANY, St. Paul, MN (US)

(72) Inventors: Guy D. Joly, Shoreview, MN (US); Ahmed S. Abuelyaman, Woodbury, MN (US); Joel D. Oxman, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 158 days.

(21) Appl. No.: 18/248,897

(22) PCT Filed: Oct. 19, 2021

(86) PCT No.: PCT/IB2021/059626
§ 371 (c)(1),
(2) Date: Apr. 13, 2023

(87) PCT Pub. No.: WO2022/096973
PCT Pub. Date: May 12, 2022

(65) Prior Publication Data
US 2023/0323151 A1  Oct. 12, 2023

Related U.S. Application Data

(60) Provisional application No. 63/109,881, filed on Nov. 5, 2020.

(51) Int. Cl.
*C09D 139/04* (2006.01)
*C08F 226/06* (2006.01)
*C09D 7/20* (2018.01)
*C09D 7/40* (2018.01)
*C09D 7/61* (2018.01)
*C09D 7/63* (2018.01)

(52) U.S. Cl.
CPC .......... *C09D 139/04* (2013.01); *C08F 226/06* (2013.01); *C09D 7/20* (2018.01); *C09D 7/61* (2018.01); *C09D 7/63* (2018.01); *C09D 7/68* (2018.01)

(58) Field of Classification Search
CPC ..... C09J 133/12; C09J 163/08; C09D 133/24; C09D 135/02; C09D 139/04; C08F 222/103; C08F 222/40; C08F 230/085; C08K 3/36
See application file for complete search history.

(56) References Cited

U.S. PATENT DOCUMENTS

| | | |
|---|---|---|
| 3,347,954 A | 10/1967 | Hellmut et al. |
| 3,637,603 A | 1/1972 | Hoyt et al. |
| 3,706,716 A | 12/1972 | Hoyt et al. |
| 4,503,169 A | 3/1985 | Randklev |
| 4,547,323 A | 10/1985 | Carlson |
| 4,886,861 A | 12/1989 | Janowicz |
| 5,324,879 A | 6/1994 | Hawthorne |
| 5,976,690 A | 11/1999 | Williams et al. |
| 6,037,476 A | 3/2000 | Belmont |
| 6,284,898 B1 | 9/2001 | Moszner et al. |
| 6,376,590 B2 | 4/2002 | Kolb et al. |
| 6,387,981 B1 | 5/2002 | Zhang et al. |
| 6,572,693 B1 | 6/2003 | Wu et al. |
| 6,627,384 B1 | 9/2003 | Kim et al. |
| 6,730,156 B1 | 5/2004 | Windisch et al. |
| 6,794,520 B1 | 9/2004 | Moszner et al. |
| 6,893,731 B2 | 5/2005 | Kausch |
| 7,090,721 B2 | 8/2006 | Craig et al. |
| 7,090,722 B2 | 8/2006 | Budd et al. |
| 7,156,911 B2 | 1/2007 | Kangas et al. |
| 7,241,437 B2 | 7/2007 | Davidson et al. |
| 7,514,202 B2 | 4/2009 | Ohsawa et al. |
| 7,649,029 B2 | 1/2010 | Kolb et al. |
| 7,674,850 B2 | 3/2010 | Karim et al. |
| 7,943,680 B2 | 5/2011 | Bowman et al. |
| 8,545,225 B2 | 10/2013 | Takei et al. |
| 8,647,510 B2 | 2/2014 | Kolb et al. |
| 9,056,043 B2 | 6/2015 | Joly et al. |
| 9,237,990 B2 | 1/2016 | Abuelyaman et al. |

(Continued)

FOREIGN PATENT DOCUMENTS

| | | |
|---|---|---|
| DE | 4219700 A1 | 12/1992 |
| EP | 0059451 B1 | 7/1985 |

(Continued)

OTHER PUBLICATIONS

International Search report for PCT International Application No. PCT/IB2020/061147, mailed on Feb. 28, 2023, 5 pages.
"Epoxy Resins", Encyclopedia Of Polymer Science And Engineering, 1986, vol. 06, pp. 322-382.
"Initiators Poly-Reactions-Optical Activity", Acta Polymerica, Advances In Polymer Science, 1985, vol. 36, No. 12, pp. 700-701.
"MIRAMER M1088", Technical Data Sheet, Miwon Specialty Chemical Co., Ltd., Version 1, 2019, p. 1.
"Structural Adhesive Market Size Worth $31.87 Billion By 2030", Grand View Research, [retrieved from the Internet on Jul. 14, 2023], URL: <https://www.grandviewresearch.com/press-release/global-structural-adhesives-market>, 2023, pp. 1-6.
Alder, "Intramolecular Thermal Cyclization Reactions of Diacryloylamines", Journal Of American Chemical Society, 1983, vol. 105, pp. 6712-6714.

(Continued)

Primary Examiner — Mark S Kaucher
(74) Attorney, Agent, or Firm — Carolyn A. Fischer

(57) ABSTRACT

A polymerizable composition is described comprising at least one monomer, oligomer, polymer, or a combination thereof comprising ethylenically unsaturated groups; and at least one cyclic imide monomer comprising an α, β-unsaturated carbonyl. The cyclic imide monomer comprises an imide group and the α, β-unsaturated carbonyl in a heterocyclic ring wherein the ring comprises at least 6 covalently bonded atoms. Also described are cyclic imide monomers, (e.g. hardcoat) compositions, methods of making a coated substrate, cyclic imide monomers, and methods of making cyclic imide monomers.

14 Claims, No Drawings

(56) References Cited

U.S. PATENT DOCUMENTS

| | | | |
|---|---|---|---|
| 9,403,966 B2 | 8/2016 | Joly et al. | |
| 9,410,030 B2 | 8/2016 | Joly et al. | |
| 9,907,733 B2 | 3/2018 | Joly et al. | |
| 9,957,408 B2 | 5/2018 | Thompson | |
| 10,131,811 B2 | 11/2018 | Herm et al. | |
| 10,676,655 B2 | 6/2020 | Shafer et al. | |
| 2004/0006161 A1* | 1/2004 | Daido | C08L 51/08 |
| | | | 523/400 |
| 2004/0054079 A1* | 3/2004 | Su | C08F 212/08 |
| | | | 525/70 |
| 2004/0225074 A1* | 11/2004 | Musa | C08G 65/18 |
| | | | 525/330.3 |
| 2006/0009574 A1 | 1/2006 | Aert et al. | |
| 2006/0147177 A1 | 7/2006 | Jing et al. | |
| 2006/0148950 A1 | 7/2006 | Davidson et al. | |
| 2008/0076848 A1 | 3/2008 | Jin et al. | |
| 2008/0194722 A1 | 8/2008 | Abuelyaman et al. | |
| 2011/0187009 A1 | 8/2011 | Masuko et al. | |
| 2012/0208965 A1 | 8/2012 | Joly et al. | |
| 2012/0308798 A1* | 12/2012 | Ryu | G02B 5/3033 |
| | | | 427/163.1 |
| 2013/0025495 A1* | 1/2013 | Hood | C09D 11/326 |
| | | | 427/256 |
| 2014/0220512 A1 | 8/2014 | Abuelyaman et al. | |
| 2015/0238389 A1 | 8/2015 | Moser et al. | |
| 2017/0174835 A1* | 6/2017 | Hsieh | H05K 1/0373 |
| 2017/0210693 A1 | 7/2017 | Joly et al. | |
| 2020/0393762 A1 | 12/2020 | Ogawa et al. | |
| 2021/0011380 A1* | 1/2021 | Nihashi | G03F 7/0397 |
| 2023/0303898 A1 | 9/2023 | Ostlund et al. | |
| 2023/0323151 A1 | 10/2023 | Joly et al. | |

FOREIGN PATENT DOCUMENTS

| | | |
|---|---|---|
| EP | 2401998 A1 | 1/2012 |
| JP | 07196867 A | 8/1995 |
| JP | 4028026 B2 | 12/2007 |
| JP | 2014513154 A | 5/2014 |
| WO | 2001030305 A1 | 5/2001 |
| WO | 2001030307 A1 | 5/2001 |
| WO | 2002055622 A2 | 7/2002 |
| WO | 2003063804 A1 | 8/2003 |
| WO | 2008082881 A1 | 7/2008 |
| WO | 2009091551 A1 | 7/2009 |
| WO | 2011126647 A2 | 10/2011 |
| WO | 2012003136 A1 | 1/2012 |
| WO | 2012112304 A1 | 8/2012 |
| WO | 2012112321 A2 | 8/2012 |
| WO | 2012112350 A2 | 8/2012 |
| WO | 2013028397 A2 | 2/2013 |
| WO | 2013028401 A1 | 2/2013 |
| WO | 2014092186 A1 | 6/2014 |
| WO | 2014099317 A1 | 6/2014 |
| WO | 2019167725 A1 | 9/2019 |
| WO | WO-2019187881 A1 * | 10/2019 ........... G03F 7/0045 |
| WO | 2023105315 A1 | 6/2023 |
| WO | 2023105327 A1 | 6/2023 |
| WO | 2023187506 A1 | 10/2023 |

OTHER PUBLICATIONS

Cara, "Influence of Bis-GMA Derivative Monomer-Based Particulate Composite Resins on the Cuspal Deformation And Microleakage of Restored Teeth", Particulate Science and Technology, 2010, vol. 28, pp. 191-206.

Crivello, "Cationic polymerization—Iodonium and Sulfonium Salt Photoinitiators", Advances in Polymer Science, vol. 62, (1984) pp. 1-48.

Dietliker, "Chemistry And Technology of UV And EB Formulation For Coatings", Inks & Paints, SITA Technology, 1991, vol. III, pp. 276-298.

Enikolopyan, "Catalyzed Chain Transfer to Monomer in Free Radical Polymerization", Journal of Polymer Science: Polymer Chemistry Edition, 1981, vol. 19, pp. 879-889.

Galanti, "The Synthesis of Biscitraconimides and Polybiscitraconimides", Journal of Polymer Science: Part A: Polymer Chemistry, 1981, vol. 19, No. 02, pp. 451-475, XP055410601.

Hutson, "Chain Transfer Activity of ω-Unsaturated Methacrylic Oligomers In Polymerizations of Methacrylic Monomers", Macromolecules, 2004, vol. 37, pp. 4441-4452.

International Search Report for PCT International Application No. PCT/IB2021/059626, mailed on Jan. 27, 2022, 5 pages.

Kloxin, "Stress Relaxation via Addition-Fragmentation Chain Transfer in a Thiol-ene Photopolymerization", Macromolecules, 2009, vol. 42, pp. 2551-2556.

Lee, "Handbook of Epoxy Resins", 1967, pp. 1-33.

Medway, Heterocycle Construction Using The Biomass-Derived Building Block Itaconic Acid, Green Chemistry, 2014, vol. 16, No. 04, pp. 2084-2101, XP055880150.

Moad, "Chain Transfer Activity of ω-Unsaturated Methyl Methacrylate Oligomers", Macromolecules, 1996, vol. 29, pp. 7717-7726.

Sakaguchi, "Testing of Dental Materials and Biomechanics" Craig's Restorative Dental Materials, 13th Edition., (2012), p. 86.

Sarac, "Redox Polymerization", Progress in Polymer Science, 1999, vol. 24, pp. 1149-1204.

Steele, "The physical interaction of gases with crystalline solids: I. Gas-solid energies and properties of isolated adsorbed atoms", Surface & Colloid Science, 1973, vol. 36, No. 01, pp. 317-352.

Wang, "Poly(a-Methyleneglutarimide)s from Radical Polymerization of a-Methyleneglutarimides", Journal of Polymer Science, Part A: Polymer Chemistry, 2018, vol. 56, pp. 1020-1026.

Wulff, "On The Synthesis Of C-Glycosyl Compounds Containing Double Bonds Without The Use Of Protecting Groups", Carbohydrate Research, 1994, vol. 257, pp. 81-95.

International Search report for PCT International Application No. PCT/IB2020/060513, mailed on Jan. 16, 2023, 4 pages.

* cited by examiner

IMIDE ADDITION-FRAGMENTATION AGENTS

BACKGROUND

Addition-fragmentation agents have been described. For example, WO2012/112350 and WO2012/112304 describe ethylenically unsaturated addition-fragmentation agents of the formula:

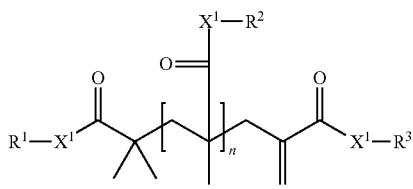

wherein
$R^1$, $R^2$ and $R^3$ are each independently $Z_m$-Q-, a (hetero) alkyl group or a (hetero)aryl group with the proviso that at least one of $R^1$, $R^2$ and $R^3$ is $Z_m$-Q-,
Q is a linking group have a valence of m+1;
Z is an ethylenically unsaturated polymerizable group,
m is 1 to 6, preferably 1 to 2;
each $X^1$ is independently —O— or —$NR^4$—, where $R^4$ is H or $C_1$-$C_4$ alkyl, and
n is 0 or 1.

As described in WO2012/112350 and WO2012/112304, free-radical polymerization is typically accompanied by a reduction in volume as monomers are converted to polymer. The volumetric shrinkage produces stress in the cured composition, leading to a microcracks and deformation.

SUMMARY

In one embodiment, a polymerizable composition is described comprising at least one monomer, oligomer, polymer, or a combination thereof comprising ethylenically unsaturated groups; and at least one cyclic imide monomer comprising an α, β-unsaturated carbonyl. The cyclic imide monomer comprises an imide group and the α, β-unsaturated carbonyl in a heterocyclic ring wherein the ring comprises at least 6 covalently bonded atoms. Some representative cyclic imide monomers include

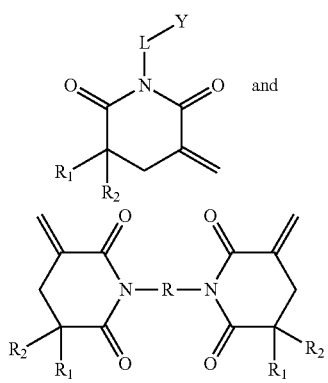

wherein L is a covalent bond or an organic linking group;
Y is alkyl, aryl, hydroxyl, carboxylic acid, or ethylenically unsaturated group;
R is an organic linking group; and
$R_1$ and $R_2$ are independently substituents including C1 to C4 alkyl groups.

As compared to ethylenically unsaturated addition-fragmentation agents of the formula of WO2012/112350 and WO2012/112304, the cyclic imide monomers described herein may comprise a single α, β-unsaturated carbonyl in the absence of an additional ethylenically unsaturated groups. The α, β-unsaturated carbonyl of the cyclic imide monomers can react with other free radicals, such as a terminal free radical of a polymer chain or monomer. Such reaction can cause the cyclic imide monomers to ring open during polymerization thereby forming radicals. The ring opening reaction can contribute to a reduction in shrinkage and stress. Further, the described cyclic imide monomers can act as chain-transfer agents after the initial ring-opening reaction via an addition-fragmentation process whereby the structure cleaves adjacent to the α, β-unsaturated carbonyl moiety. This dynamic bond-breaking and bond formation process provides a reduction in polymerization-based stress.

In some embodiments, the cyclic imide monomers further comprise one or more additional (e.g. free-radically) polymerizable ethylenically unsaturated groups. In this embodiment, the cyclic imide monomers can provide increased crosslinking.

Also described are cyclic imide monomers, (e.g. hardcoat) compositions, methods of making a coated substrate, cyclic imide monomers, and methods of making cyclic imide monomers.

DETAILED DESCRIPTION

Presently described are cyclic imide monomers comprising an α, β-unsaturated carbonyl. In some embodiments, the cyclic imide monomers can act as addition-fragmentation agents in a free-radically polymerizable composition.

The addition-fragmentation monomer comprises at least one imide group consisting of two acyl groups bound to nitrogen. The cyclic imide monomer described herein further comprises an alpha, beta-unsaturation (α,β-unsaturation) i.e. a pi bond between the alpha and beta carbons adjacent to a carbonyl group.

The cyclic imide monomers are typically prepared by reacting a dicarboxylic acid comprising an α,β-unsaturated carbonyl with a dehydrating agent, such as acetic anhydride, forming a cyclic compound comprising an anhydride group and an α, β-unsaturated carbonyl; and reacting the anhydride group with an (e.g. primary) amine compound.

The dicarboxylic acids comprise at least three contiguous carbon atoms having an α,β-unsaturated carbonyl between the acid groups. Thus, the imide group and alpha, beta-unsaturation are typically present in a heterocyclic ring wherein the ring comprises at least 6 covalently bonded atoms. In other words, the cyclic imide monomers described herein comprise one or more heterocyclic rings wherein the ring(s) comprise 6 or more covalently bonded atoms in a heterocyclic ring, the heterocyclic ring comprising both an imide group and an αβ-unsaturated carbonyl.

One representative dicarboxylic acid comprising an α,β-unsaturated carbonyl is depicted as follows:

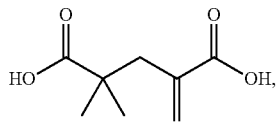

2,2,-dimethyl-4-methylidenepentanedioic acid (also described as 2,4-biscarboxy-4-methylpent-1-ene or 2,2-dimethyl-4-methylene glutaric acid).

In some embodiments, such dicarboxylic acid is used to prepare a cyclic imide monomer comprising a single ring. The cyclic imide monomer may have the structure

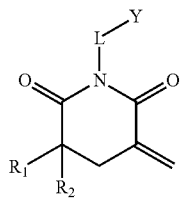

wherein L is a covalent bond or an organic linking group; Y is alkyl, aryl, hydroxyl, carboxylic acid, or a an ethylenically unsaturated group; and $R_1$ and $R_2$ are independently (e.g. organic) substituents.

In some embodiments, $R_1$ and $R_2$ are independently C1 to C4 alkyl groups (e.g. methyl, ethyl, propyl, or butyl). In some embodiments, $R_1$ and $R^2$ are (e.g. organic) substituents such that the cyclic imide monomer ring-opens during polymerization thereby forming radicals. In some embodiments, $R_1$ and/or $R_2$ are typically not hydrogen.

L typically comprises (hetero)alkylene, (hetero)arylene, or a combination thereof. In some embodiments, the alkylene or arylene linking group (i.e. L) comprises heteroatoms, such oxygen. For example, L may comprise one or more ester moieties, one or more urethane moieties, and/or one or more pendent hydroxyl groups.

In some embodiments, 2,2-dimethyl-4-methylene glutaric anhydride is used to prepare a cyclic imide monomer comprising two rings or in other words a cyclic bis-imide. The cyclic bis-imide monomer may have the structure:

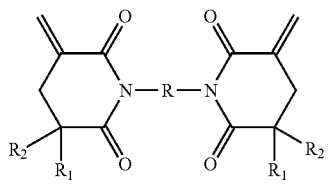

wherein R is an organic linking group, and $R_1$ and $R_2$ are independently substituents, as previously described.

R typically comprises (hetero)alkylene, (hetero)arylene, or a combination thereof.

In some embodiments, the alkylene or arylene linking group (i.e. R) may comprise heteroatoms, such oxygen or nitrogen. For example, R may comprise one or more ester moieties, one or more urethane moieties, and/or one or more pendent hydroxyl groups. R may optionally further comprise a pendent ethylenically unsaturated group In some embodiments, the cyclic imide monomer comprises at least one (e.g. free-radically polymerizable) ethylenically unsaturated group in combination with the α,β-unsaturation. In this embodiment, Y is a (e.g. free-radically polymerizable) ethylenically unsaturated group or R of the cyclic bis-imide further comprises a pendent (e.g. free-radically polymerizable) ethylenically unsaturated group. In this embodiment, the number of ethylenically unsaturated polymerizable groups of the cyclic imide monomer is ≥2. In some embodiments, the number of ethylenically unsaturated polymerizable groups of the cyclic imide monomer is no greater than 3.

The one or more additional ethylenically unsaturated groups may include, but are not limited to the following structures, include for example (meth)acryl (i.e. (meth) acryloyl and (meth)acrylamide), vinyl, styrenic and ethynyl.

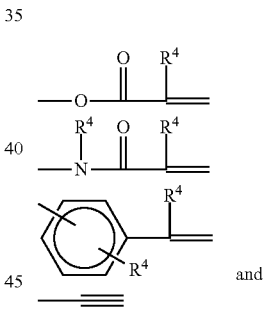

wherein $R^4$ is H or $C_1$-$C_4$ alkyl.

Some representative cyclic imide monomers, as synthesized in the forthcoming examples are as follows:

TABLE A

Imide-Based Addition-Fragmentation Monomers

| Cyclic imide monomers Example No. | Chemical Structure |
|---|---|
| CIM-1 | |

TABLE A-continued
Imide-Based Addition-Fragmentation Monomers
| Cyclic imide monomers Example No. | Chemical Structure |
|---|---|
| CIM-2 | 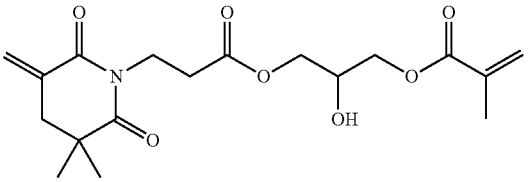 [SMILES: C=C(C)C(=O)OCC(O)COC(=O)CCN1C(=O)C(=C)CC(C)(C)C1=O] |
| CIM-3 | 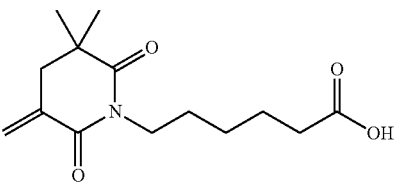 [SMILES: C=C1CC(C)(C)C(=O)N(CCCCCC(=O)O)C1=O] |
| CIM-4 | 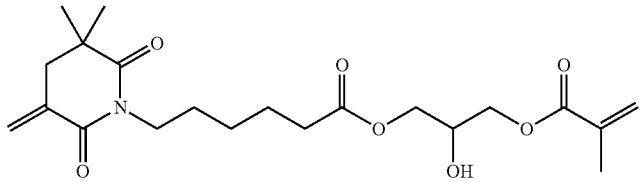 [SMILES: C=C(C)C(=O)OCC(O)COC(=O)CCCCCN1C(=O)C(=C)CC(C)(C)C1=O] |
| CIM-5 | 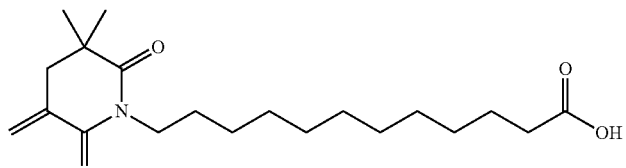 |
| CIM-6 | 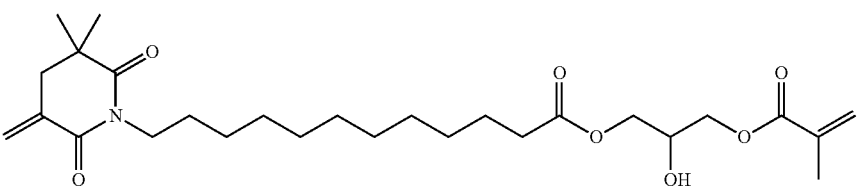 [SMILES: C=C(C)C(=O)OCC(O)COC(=O)CCCCCCCCCCCN1C(=O)C(=C)CC(C)(C)C1=O] |
| CIM-7 | 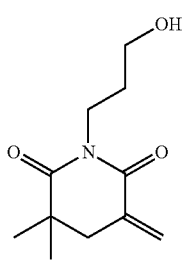 |

TABLE A-continued
Imide-Based Addition-Fragmentation Monomers
| Cyclic imide monomers Example No. | Chemical Structure |
|---|---|
| CIM-8 | 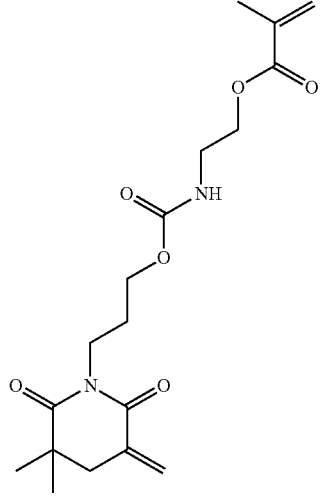 [SMILES: C=C(C)C(=O)OCCNC(=O)OCCCN1C(=O)C(=C)CC(C)(C)C1=O] |
| CIM-9 | 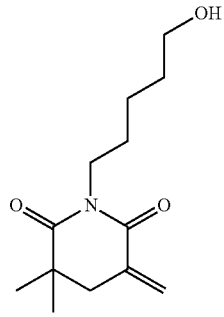 [SMILES: C=C1CC(C)(C)C(=O)N(CCCCCO)C1=O] |
| CIM-10 | 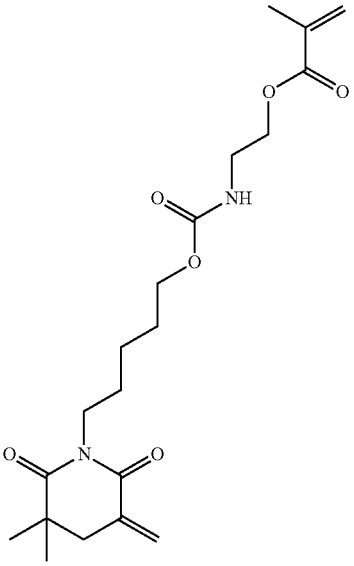 [SMILES: C=C(C)C(=O)OCCNC(=O)OCCCCCN1C(=O)C(=C)CC(C)(C)C1=O] |

TABLE A-continued

Imide-Based Addition-Fragmentation Monomers

| Cyclic imide monomers Example No. | Chemical Structure |
|---|---|
| CIM-11 | *structure: 3,3-dimethyl-5-methylidene cyclic imide N-substituted with 2,3-dihydroxypropyl group* |
| BCIM-1 | *structure: two 3,3-dimethyl-5-methylidene cyclic imide groups connected by a hexamethylene linker* |
| BCIM-2 | *structure: two 3,3-dimethyl-5-methylidene cyclic imide groups connected by a heptamethylene linker* |
| BCIM-3 | *structure: two 3,3-dimethyl-5-methylidene cyclic imide groups connected by a longer methylene linker* |
| HBCIM | *structure: two 3-methylidene cyclic imide groups connected by a 2-hydroxypropylene linker* |

TABLE A-continued

Imide-Based Addition-Fragmentation Monomers

| Cyclic imide monomers Example No. | Chemical Structure |
|---|---|
| MA-BCM-1 | 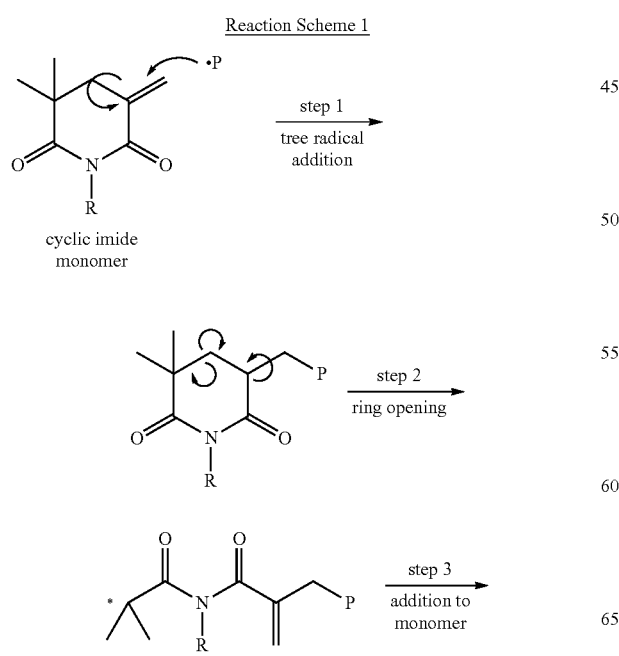 |

Although these depicted cyclic imide monomers comprise a (meth)acrylate or carboxylic acid group as a representative (e.g. free-radically polymerizable) ethylenically unsaturated groups, such monomers can alternatively have (meth)acrylamide, vinyl, styrenic or ethynyl (e.g. free-radically polymerizable) ethylenically unsaturated groups.

The molecular weight of the cyclic imide monomers is at least 150 g/mole. In typical embodiments, the molecular weight of the monomer is no greater than 1500, 1000, 750, or 500 g/mole.

Without intending to be bound by theory, it is believed that the addition-fragmentation monomer follows an addition-fragmentation pathway as shown in the following representative Reaction Scheme 1, wherein the -R bonded to the nitrogen atom is L-Y, as previously described.

Reaction Scheme 1

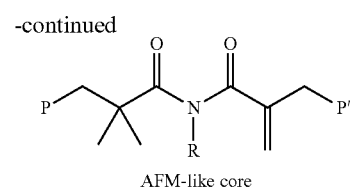

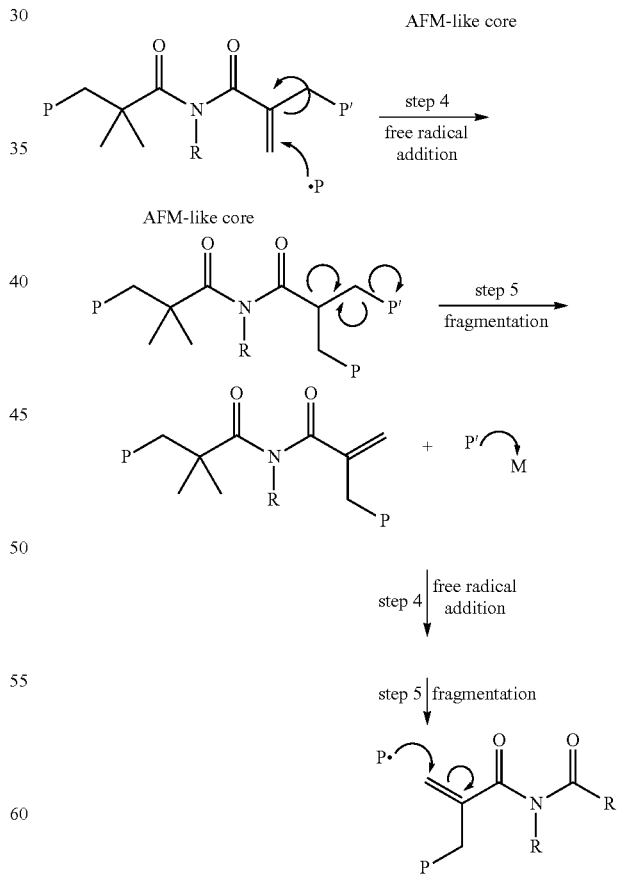

In Scheme 1, Step 1 a free-radically polymerizable ethylenically unsaturated monomer, oligomer, or polymer, represented by P·, adds to the α,β-unsaturation of the cyclic imide monomer. In Step 2, the cyclic monomer ring opens into the following linear imide comprising an α,β-unsaturation

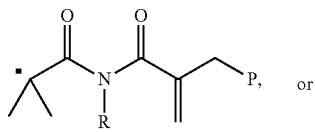

or

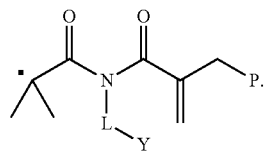

In Step 3, the α-carbonyl tertiary radical (adjacent the pendent dimethyl group) can initiate polymerization of a monomer.

In Step 4, a free-radically polymerizable ethylenically unsaturated oligomer or polymer, represented by P·, adds to the α,β-unsaturation of the cyclic imide monomer. When at least two of the P groups are polymer chains, this reaction may be characterized as crosslinking.

The crosslink can fragment as shown in Step 5 to form a stable α-carbonyl tertiary radical (represented by P·M) and a residue bearing an α,β-unsaturation. The α,β-unsaturation can undergo radical addition, as depicted in Step 4, that can subsequently fragment, as depicted in Step 5. Thus, Steps 4 and 5 can be repeated to further relieve polymerization stress.

As shown in Reaction Scheme 1, the addition-fragmentation cyclic imide comprising an α,β-unsaturation monomer, but lacking an additional ethylenically unsaturated polymerizable group provides several mechanisms for stress relief. Further, stress relief may also be a result of slower cure rates in the presence of the cyclic imide addition-fragmentation monomers, delaying the gel point. Post-gel shrinkage is a major component in stress development; therefore, delaying the gel point even slightly may lead to stress relief by allowing additional time for material to flow during the curing process.

In another embodiment, the imide ring structure comprises an alpha, beta unsaturation and at least one additional (e.g. free-radically polymerizable) ethylenically unsaturated group. As depicted in the following Reaction Scheme 2, such cyclic imide monomer can provide all the same polymer and monomer additions as well as ring-opening and chain cleavage fragmentations as depicted in Reaction Scheme 1. In this embodiment, the additional ethylenically unsaturated group can also polymerize, or in other words crosslink.

Reaction Scheme 2

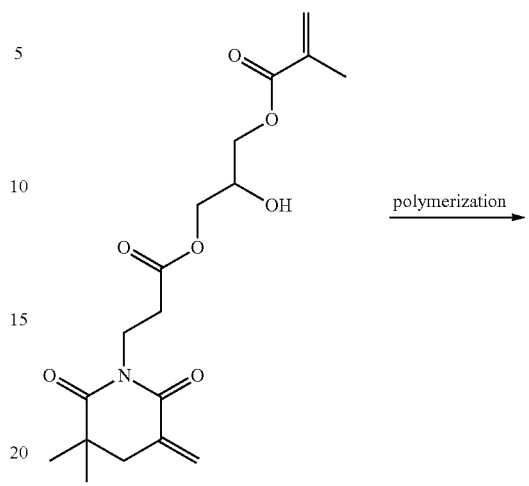

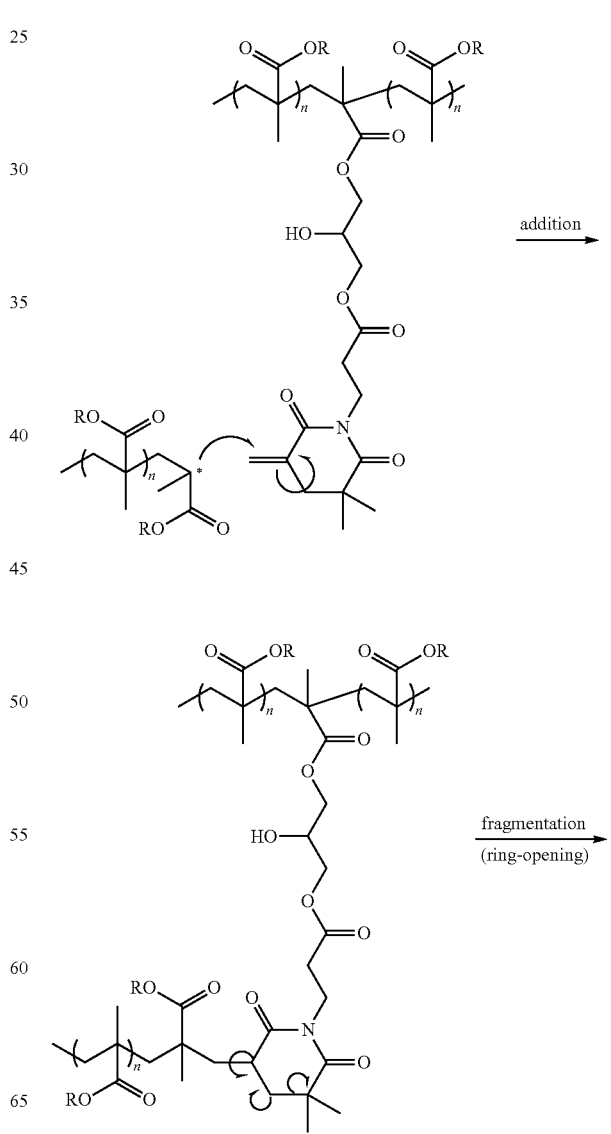

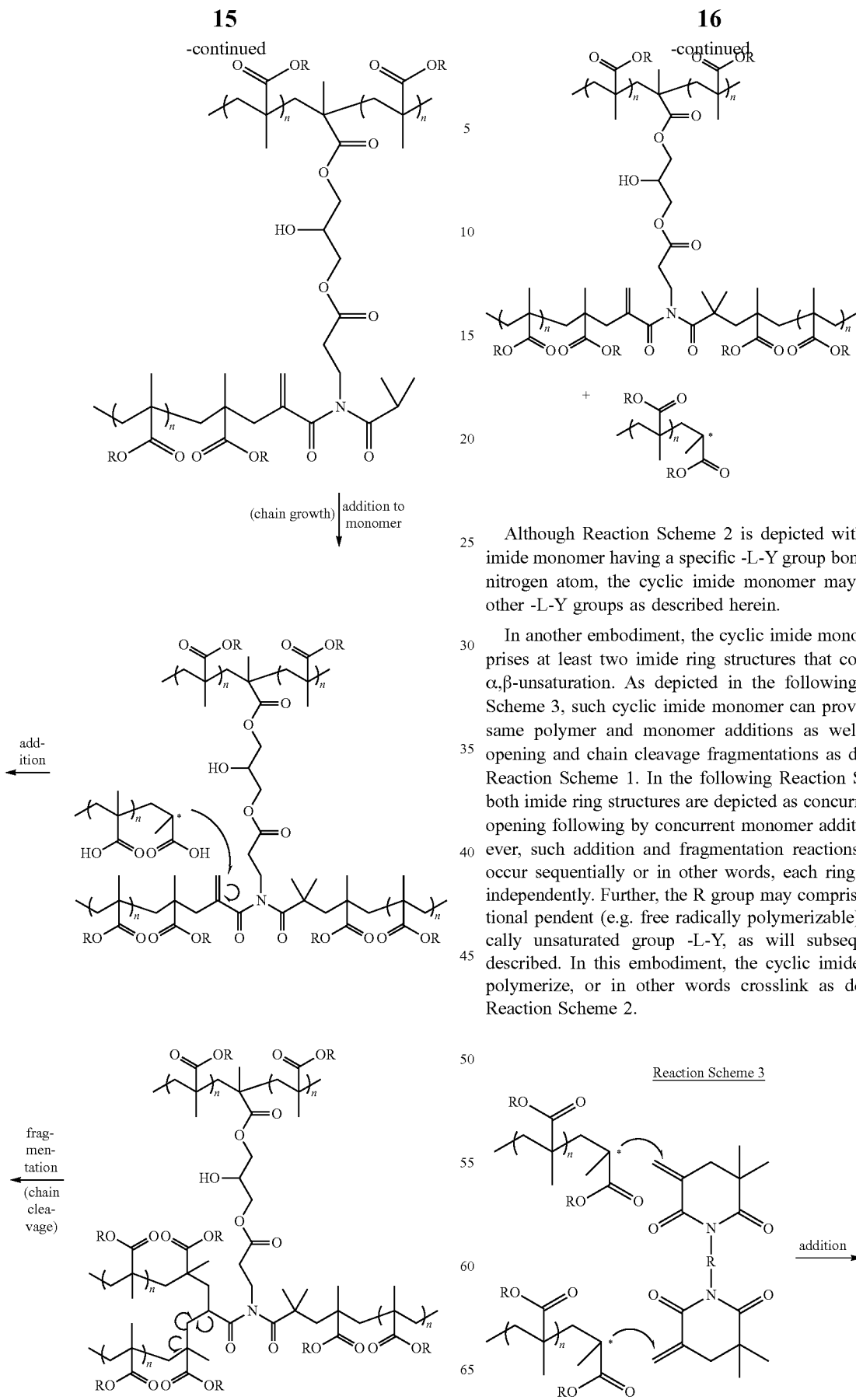

Although Reaction Scheme 2 is depicted with a cyclic imide monomer having a specific -L-Y group bonded to the nitrogen atom, the cyclic imide monomer may comprise other -L-Y groups as described herein.

In another embodiment, the cyclic imide monomer comprises at least two imide ring structures that comprise an α,β-unsaturation. As depicted in the following Reaction Scheme 3, such cyclic imide monomer can provide all the same polymer and monomer additions as well as ring-opening and chain cleavage fragmentations as depicted in Reaction Scheme 1. In the following Reaction Scheme 3, both imide ring structures are depicted as concurrently ring opening following by concurrent monomer addition. However, such addition and fragmentation reactions can also occur sequentially or in other words, each ring can react independently. Further, the R group may comprise an additional pendent (e.g. free radically polymerizable) ethylenically unsaturated group -L-Y, as will subsequently be described. In this embodiment, the cyclic imide can also polymerize, or in other words crosslink as depicted in Reaction Scheme 2.

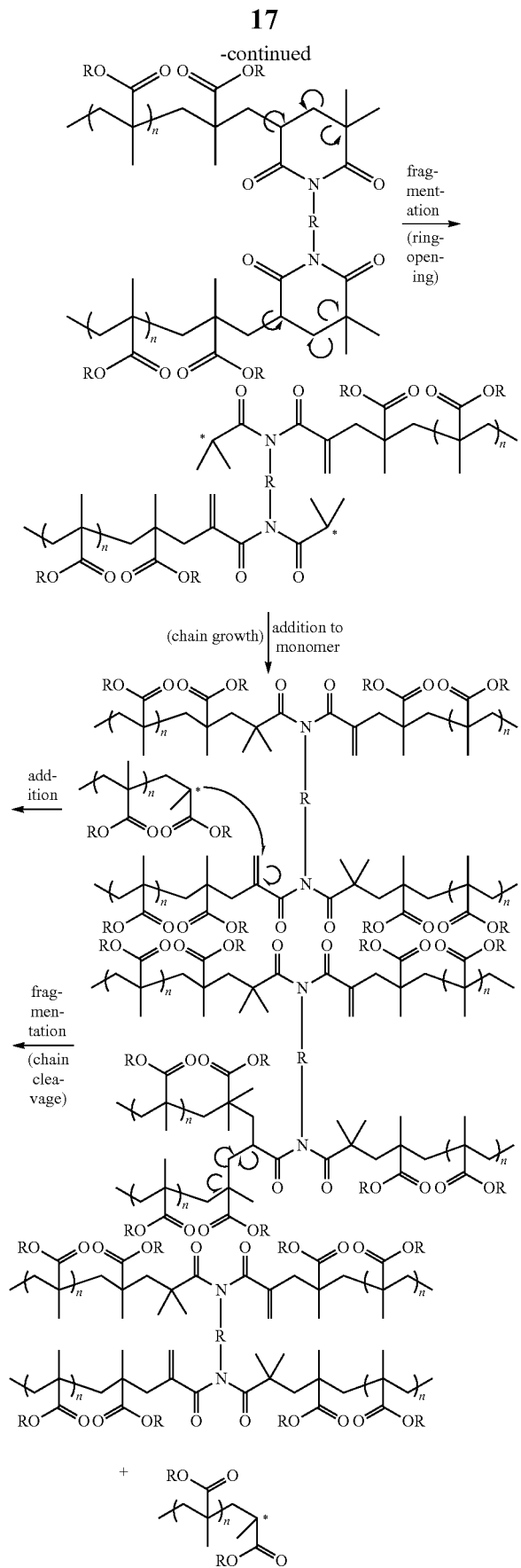

Although Reaction Schemes 1-3 are depicted with a specific 6-membered cyclic imide monomer, other cyclic imide monomers comprising at least 6 covalently bonded atoms and an α,β-unsaturation would follow the same or similar addition-fragmentation pathway.

In one embodiment, a method of preparing a cyclic imide monomer comprising an α, β-unsaturated carbonyl is described. The method comprises reacting a dicarboxylic acid comprising an α, β-unsaturated carbonyl with a dehydrating agent forming a cyclic compound comprising an anhydride group and an α, β-unsaturated carbonyl; and reacting the anhydride group with a compound comprising an amine group and a unreactive group such as alkyl or aryl or a reactive group such as carboxylic acid or hydroxyl group forming a cyclic compound comprising an α, β-unsaturated carbonyl and an imide group.

One representative dicarboxylic acid is 2,2,-dimethyl-4-methylidenepentanedioic acid, as previously described. Other dicarboxylic acids can be utilized provided that the dicarboxylic acids comprises at least three contiguous carbon atoms bearing an α, β-unsaturated carbonyl between the acid groups, as previously described.

Suitable dehydrating agents including acid anhydrides such as acetic anhydride and trifluoroacetic anhydride; phosphorus-based dehydrating agents such as phosphorus pentachloride or phosphorus pentoxide, carbodiimide-based dehydrating agents such as dicyclohexylcarbodiimide.

Representative compounds comprising a (e.g. primary) amine group and an alkyl or aryl terminal group include 4-aminostyrene, butyl amine, pentyl amine, hexyl amine, phenethylamine and benzyl amine.

A representative reaction scheme is as follows:

Reaction Scheme 4

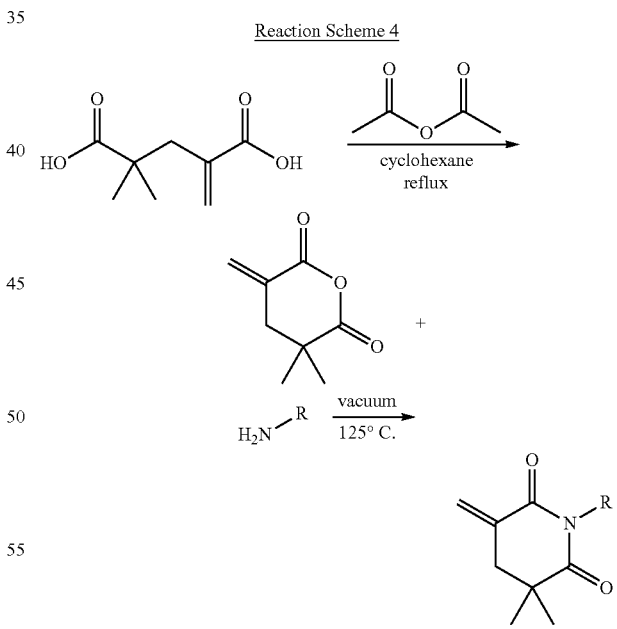

Suitable (e.g. aliphatic) compounds comprising an amine group and a carboxylic acid group typically comprise a primary amine group bonded to a terminal acid group by means of an alkylene linking group. The alkylene linking group typically comprises 2-12 carbon atoms. Representative examples include for example 3-aminopropanoic acid, 4-aminobutanoic acid, 3-aminobutanoic acid, 2-aminobutanoic acid, 5-aminopentanoic acid, 2-aminopentanoic acid, 3-aminopentanoic acid, 4-aminopentanoic acid, 6-aminohexanoic acid, 2-aminohexanoic acid, 3-aminohexanoic acid, 4-aminohexanoic acid, 5-aminohexanoic acid, 7-aminoheptanoic acid, 6-aminoheptanoic acid, 5-aminoheptanoic acid, 4-aminoheptanoic acid, 3-aminoheptanoic acid, 2-aminoheptanoic acid, 8-aminoctanoic acid, 7-aminoctanoic acid, 6-aminoctanoic acid, 5-aminoctanoic acid, 4-aminoctanoic acid, 3-aminoctanoic acid, 2-aminoocatanoic acid, 6-amino caproic acid, and 12-aminododecanoic acid. Other suitable compounds comprising an amine group and a carboxylic acid group include (e.g. naturally occurring) amino acids such as glycine, alanine, valine, isoleucine, leucine, methionine, cysteine, phenylalanine, serine (also has an alcohol), threonine (alcohol as well), tyrosine, tryptophan, asparagine, glutamine, glutamic acid, and aspartic acid, histidine, arginine, or lysine.

A representative reaction scheme is as follows:

Reaction Scheme 5

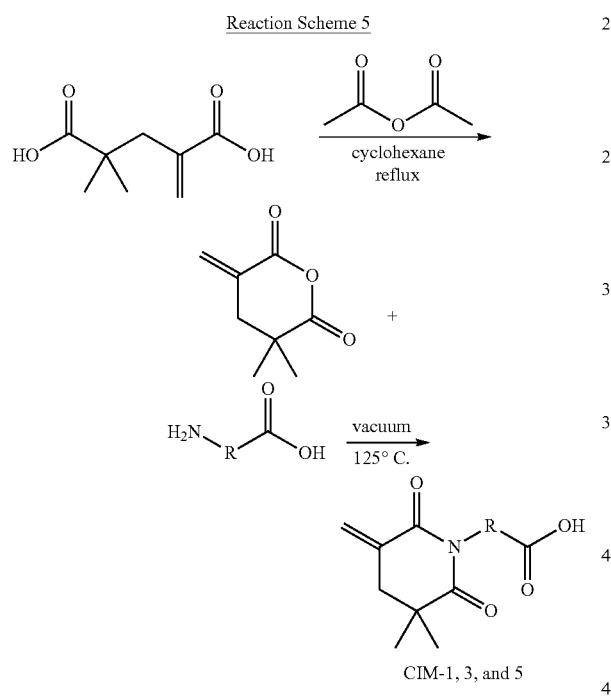

CIM-1, 3, and 5

In some embodiments, the method of preparing the cyclic imide monomer further comprises reacting the carboxylic acid group of the nitrogen atom with a compound comprising an acid reactive group and an ethylenically unsaturated (e.g. free radically polymerizable) group.

The acid reactive group is typically an epoxy group or an aziridinyl group.

Representative epoxy compounds include glycidyl (meth)acrylate, thioglycidyl (meth)acrylate, 3-(2,3-epoxypropoxy) phenyl (meth)acrylate, 2-[4-(2,3-epoxypropoxy)phenyl]-2-(4-(meth)acryloyloxy-phenyl)propane, 4-(2,3-epoxypropoxy)cyclohexyl (meth)acrylate, 2,3-epoxycyclohexyl (meth)acrylate, 3,4-epoxycyclohexyl (meth)acrylate, and 4-hydroxybutylacrylate glycidyl ether.

Representative aziridinyl compounds include N-(meth) acryloylaziridine, 2-(1-aziridinyl)ethyl (meth)acrylate, 4-(1-aziridinyl)butyl acrylate, 2-[2-(1-aziridinyl)ethoxy]ethyl (meth)acrylate, 2-[2-(1-aziridinyl)ethoxy]ethyl (meth)acrylate, 12-[2-(2,2,3,3-tetramethyl-1-aziridinyl)ethoxycarbonylamino] dodecyl (meth)acrylate, and 1-(2-propenyl)aziridine.

A representative reaction scheme is as follows:

Reaction Scheme 6

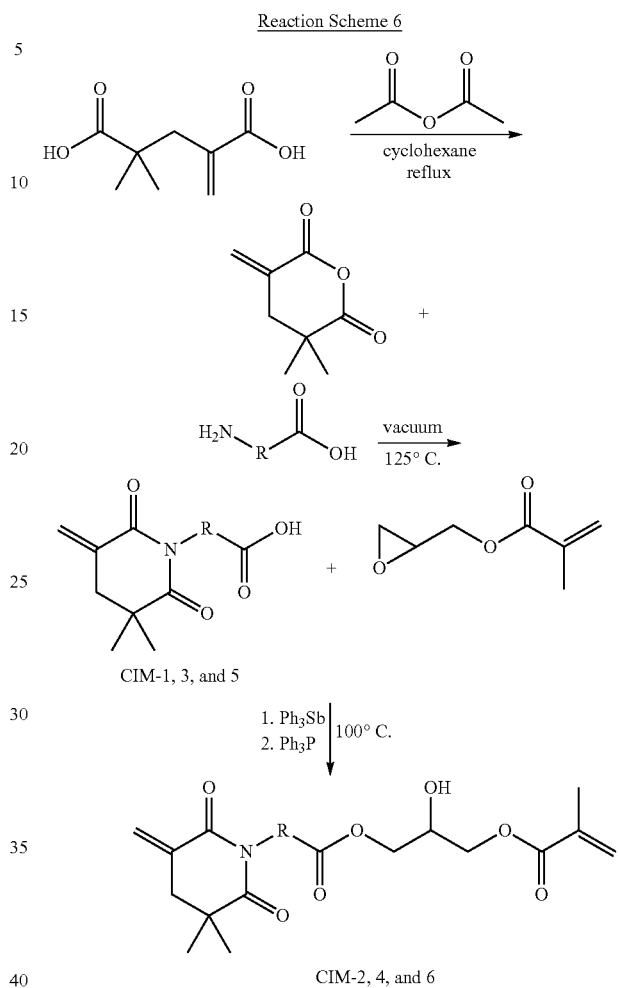

CIM-2, 4, and 6

The reaction of carboxylic acid with aziridinyl compounds is depicted in WO2012/112304.

Suitable compounds comprising an amine group and one or more hydroxyl groups including diols. Representative compounds include for example 3-amino-1-propanol, 5-amino-1-pentanol, 3-amino-1,2-propanediol.

The cyclic imide compounds having a hydroxyl group can be reacted with a compound comprising an isocyanate group and a (meth)acrylate group. Representative isocyanate compounds include 2-isocyanatoethyl (meth)acrylate, 3-isocyanatopropyl (meth)acrylate, 4-isocyanatocyclohexyl (meth) acrylate, 4-isocyanatostyrene, 2-methyl-2-propenoyl isocyanate, 4-(2-(meth)acryloyloxyethoxycarbonylamino) phenylisocyanate, allyl 2-isocyanatoethylether, and 3-isocyanato-1-propene, 3-isocyanato-1-propyne, 3-isopropenyl-α, α-dimethylbenzyl isocyanate.

The above reaction schemes depict preparing a monomer comprising a single heterocyclic ring comprising an imide group and α, β-unsaturated carbonyl.

In other embodiments, the cyclic imide monomer comprises at least two cyclic imide groups. One suitable method for preparing a cyclic bis-imide monomer comprises reacting a dicarboxylic acid comprising an α, β-unsaturated carbonyl with a dehydrating agent forming a cyclic compound comprising an anhydride group and an α, β-unsaturated carbonyl (as previously described in Reaction Scheme 4); and reacting the anhydride group with a diamine. A representative reaction scheme is as follows:

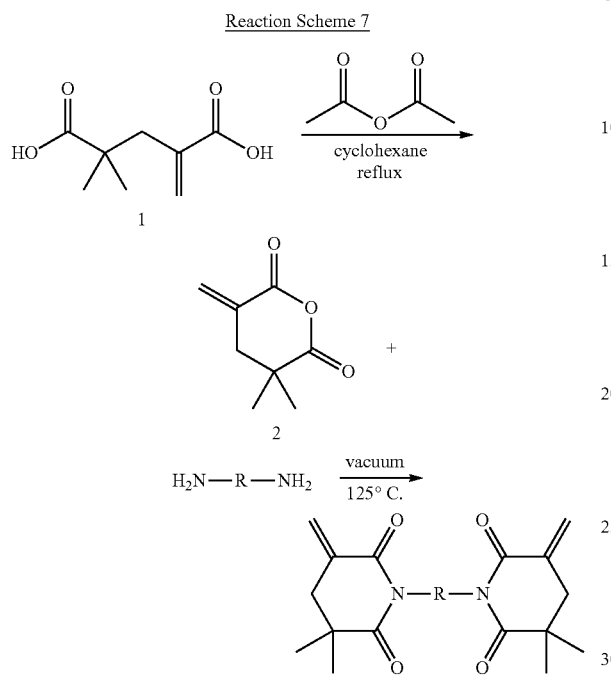

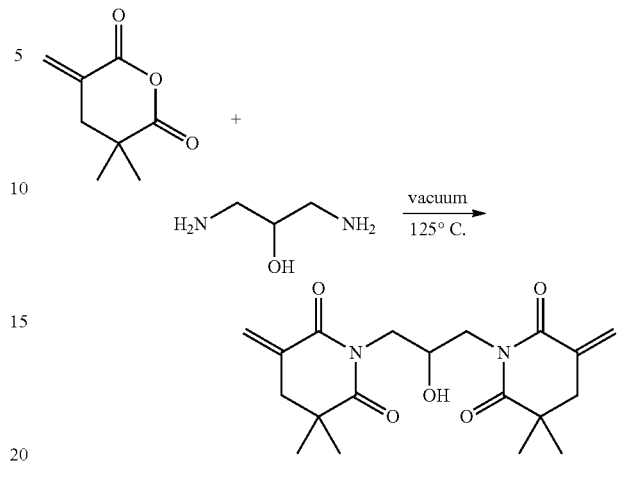

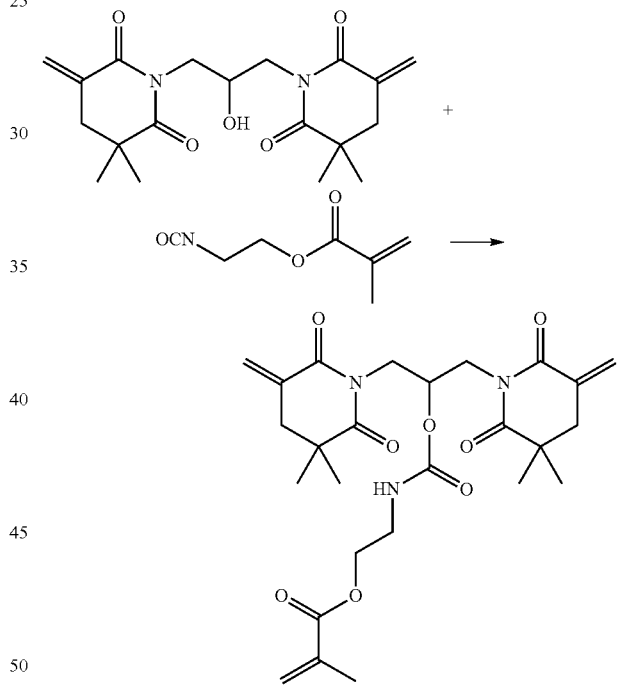

In some embodiments, the diamines is an aliphatic diamine where the amine groups are bonded with an alkylene linking group. In some embodiments, the alkylene linking group comprising 2 to 12 carbon atoms. The alkylene linking group may comprise straight-chain, branched, or cyclic moieties as well as a combination thereof. Suitable examples include ethylene diamine, 1,3-propanediamine, 1,2-propanediamine, 1,4-butanediamine, 1,2-butanediamine, 1,3-butanediamine, 1,5-pentanediamine, 1,2-pentanediamine, 1,3-pentanediamine, 1,4-pentanediamine, 2,4-pentanediamine, 1,6-hexanediamine, 1,7-heptanediamine, 1,8-octanediamine, 1,9-nonanediamine, 1,10-decanediamine, 1,12-dodecanediamine, isophorone diamine (cis and trans 5-amino-1,3,3-trimethylcyclohexanemethylamine), 1,5-diamino-2-methylpentane, trans-1,2-diaminocyclohexane, cis-1,2-diaminocyclohexane, 1,2-diphenyl-1,2-ethylenediamine, 4,4'-methylenebis(cyclohexylamine), and 4,4'methylenebis(2-methylcyclohexylamine).

In other embodiments, the diamine is an aromatic diamine wherein the amine groups are bonded with a linking group comprising an arylene moiety. The linking group typically comprises a C6 to C12 arylene group. Suitable examples include p-phenylenediamine, o-phenylenediamine, m-phenylenediamine, 4,4'-diaminobiphenyl, 4,4'-methylenedianiline.

In another embodiment, the diamine may further comprise one or more pendent reactive (e.g. hydroxyl or carboxylic acid) groups. The pendent reactive (e.g. hydroxyl group) can be reacted with a compound comprising a coreactive group and a (e.g. free-radically polymerizable) ethylenically unsaturated group, such as an isocyantoalkyl (meth)acrylate or acid reactive (meth)acrylate as previously described. Representative reaction schemes are as follows:

Although Reaction Schemes 4-6 are depicted with a specific 6-membered cyclic imide monomer, other cyclic imide monomers comprising at least 6 covalently bonded atoms and an α,β-unsaturation could be prepare using other dicarboxylic acids comprising an α, β-unsaturated carbonyl.

In some embodiments, a polymerizable composition is described comprising at least one addition-fragmentation cyclic imide monomer, as described herein. The addition-fragmentation monomer of the polymerizable composition comprises at least one cyclic imide monomer as described herein. The polymerizable composition may have a single cyclic imide monomer, a combination of two or more cyclic imide monomers, or at least one cyclic imide monomer in combination with a different addition-fragmentation monomer, such as described in WO2012/112304.

The polymerizable composition typically comprises addition-fragmentation monomer(s) in an amount of at least 0.005, 0.006, 0.007, 0.008, 0.009, or 0.01, wt. %, based on the total weight of polymerizable monomer(s), oligomer(s), and polymer(s). In some embodiments, the amount of addition-fragmentation monomer(s) is at least 0.02, 0.03, 0.04, 0.05, 0.06, 0.07, 0.08, 0.09, or 1.0 wt. %, based on the total weight of polymerizable monomer(s), oligomer(s), and polymer(s). The amount of addition-fragmentation monomer(s) is typically no greater than 10 wt. %, based on the total weight of polymerizable monomer(s), oligomer(s), and polymer(s). In some embodiments, the amount of addition-fragmentation monomer(s) is typically no greater than 9, 8, 7, 6, 5, 4, 3, 2, 1, or 0.5 wt. %, based on the total weight of polymerizable monomer(s), oligomer(s), and polymer(s). Typically, the polymerizable composition comprises the minimum amount of addition-fragmentation monomer(s) that reduces or eliminates the polymerization-based stress. Excess addition-fragmentation cyclic imide monomer(s) can reduce the mechanical properties of the polymerized composition.

The polymerizable composition comprises at least one cyclic imide monomer, as described herein and at least one (e.g. free-radically) polymerizable monomer, oligomer, polymer, or combination thereof. The polymerizable monomer, oligomer, polymer, or combination thereof comprise the same (e.g. free radically) polymerizable ethylenically unsaturated groups as previously described for the cyclic imide monomers.

As used herein the term monomer refers to a compound. Monomers of the polymerizable composition that are different monomers than the cyclic imide monomers typically have a molecular weight no greater than 2000, 1500, 1000, or 500 g/mol. Oligomers comprise repeating units having a molecular weight greater than the repeat (e.g. polymerized monomer) unit. Oligomers typically have a number average or weight average molecular weight no greater than 10,000 g/mole. Polymers have a greater number of polymerized (e.g. repeating) units than oligomers. Polymers typically have a number average or weight average molecular weight greater than 10,000 g/mole. Polymers included as a component of a polymerizable composition are soluble in the other monomers and/or oligomer of the polymerizable composition. Further, polymers included as component of a polymerizable composition typically have a weight average molecular weight or number average molecular weight of less than 100,000; 75,000, or 50,000 g/mole.

In typical embodiments, the polymerizable composition comprises one or more (e.g. free-radically polymerizable) ethylenically unsaturated monomers. Lower molecular weight monomers, especially non-cyclic monomers often exhibit the greatest amount of volume shrinkage and polymerization induced stress.

Useful multi-(meth)acrylate monomers and oligomers include:

(a) di(meth)acryl containing monomers such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing monomers such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acryl containing monomer such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acryl monomers such as, for example, urethane acrylates, polyester acrylates, and epoxy acrylates can also be employed.

Such (meth)acrylate monomers and oligomers are widely available from vendors such as, for example, Sartomer Company of Exton, Pennsylvania; Cytec Industries of Woodland Park, N; and Aldrich Chemical Company of Milwaukee, Wisconsin.

In some embodiments, the polymerizable composition may comprise a (e.g. free-radically polymerizable) ethylenically unsaturated polymer such as a (meth)acrylic polymer or urethane(meth)acrylate polymer.

In the polymerizable composition may also comprise (meth)acryl monomers having single (meth)acryl group.

In some embodiments, the polymerizable (e.g. hardcoat) composition comprises a (meth)acrylate monomer comprising at least three (meth)acrylate functional groups. In some embodiments, the monomer comprises at least four, five or six (meth)acrylate functional groups. Such monomers are also referred to as crosslinking agents. In some embodiments, acrylate functional groups tend to be favored over (meth)acrylate functional groups.

Commercially available crosslinking agents include for example trimethylolpropane triacrylate (commercially available from Sartomer Company, Exton, PA under the trade designation "SR351"), ethoxylated trimethylolpropane triacrylate (commercially available from Sartomer Company, Exton, PA under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494"), dipentaerythritol hexaacrylate, and tris(2-hydroxy ethyl) isocyanurate triacrylate (from Sartomer under the trade designation "SR368".

The concentration of (meth)acrylate monomers and/or oligomers of the polymerizable (e.g. hardcoat) composition is typically at least 40 wt. %, or 45 wt. %, or 50 wt. % solids and generally no greater than 70 wt. %, or 65 wt. %, or 40 wt. % solids, based on the total weight of the cured (e.g. hardcoat) composition.

The polymerizable (e.g. hardcoat) composition typically further comprises a inorganic particulate material.

In some embodiments, the size of inorganic oxide particles can be chosen to avoid significant visible light scattering. The (e.g. hardcoat) composition generally comprises a significant amount of surface modified inorganic oxide nanoparticles having an average (e.g. unassociated) primary particle size or associated particle size of at least 30, 40 or 50 nm and no greater than 1 micron, 500 nm, 250 nm, 200 nm, or 150 nm. In other embodiments, at least a portion of the inorganic oxide particle are micron sized rather than nanoparticle sized. The total concentration of inorganic oxide particles is typically a least 30, 35, or 40 wt-% solids and generally no greater than 70 wt-%, or 65 wt-%, or 60 wt-% solids.

The average particle size of the inorganic oxide particles can be measured using transmission electron microscopy to count the number of inorganic oxide particles of a given diameter. The inorganic oxide particles can consist essentially of or consist of a single oxide such as silica, or can comprise a combination of oxides, or a core of an oxide of one type (or a core of a material other than a metal oxide) on which is deposited an oxide of another type. Silica is a common inorganic particle utilized in (e.g. hardcoat) compositions. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid).

Aqueous colloidal silicas dispersions are commercially available from Nalco Chemical Co., Naperville, IL under the trade designation "Nalco Collodial Silicas" such as products 1040, 1042, 1050, 1060, 2327, 2329, and 2329K or Nissan Chemical America Corporation, Houston, TX under the trade name Snowtex™. Organic dispersions of colloidal silicas are commercially available from Nissan Chemical under the trade name Organosilicasol™. Suitable fumed silicas include for example, products commercially available from Evonki DeGussa Corp., (Parsippany, NJ) under the trade designation, "Aerosil series OX-50", as well as product numbers –130, –150, and –200. Fumed silicas are also commercially available from Cabot Corp., Tuscola, IL, under the trade designations CAB-O-SPERSE 2095", "CAB-O-SPERSE A105", and "CAB-O-SIL M5".

It may be desirable to employ a mixture of inorganic oxide particle types to optimize an optical property, material property, or to lower that total composition cost.

As an alternative to or in combination with silica the (e.g. hardcoat) composition may comprise various high refractive index inorganic nanoparticles. Such nanoparticles have a refractive index of at least 1.60, 1.65, 1.70, 1.75, 1.80, 1.85, 1.90, 1.95, 2.00 or higher. High refractive index inorganic nanoparticles include for example zirconia ("$ZrO_2$"), titania ("$TiO_2$"), antimony oxides, alumina, tin oxides, alone or in combination. Mixed metal oxide may also be employed.

Zirconias for use in the high refractive index layer are available from Nalco Chemical Co. under the trade designation "Nalco OOSSOO8", Buhler AG Uzwil, Switzerland under the trade designation "Buhler zirconia Z-WO sol" and Nissan Chemical America Corporation under the trade name NanoUse ZR™. Zirconia nanoparticles can also be prepared such as described in U.S. Patent Publication No. 2006/0148950 and U.S. Pat. No. 6,376,590. A nanoparticle dispersion that comprises a mixture of tin oxide and zirconia covered by antimony oxide (RI~1.9) is commercially available from Nissan Chemical America Corporation under the trade designation "HX-05M5". A tin oxide nanoparticle dispersion (RI~2.0) is commercially available from Nissan Chemicals Corp. under the trade designation "CX-S401M".

Zirconia nanoparticles can also be prepared such as described in U.S. Pat. Nos. 7,241,437 and 6,376,590.

The inorganic particulate material is typically surface modified inorganic oxide particles that add mechanical strength and durability to the cured composition. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the (e.g. hardcoat) coating composition.

Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of their surface with a surface treatment agent so that the stabilized particle can copolymerize or react with the polymerizable resin during curing. The incorporation of surface modified inorganic particles is amenable to covalent bonding of the particles to the (e.g. free-radically polymerizable) ethylenically unsaturated organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. In some embodiments, silane surface treatments are reacted with the particle or nanoparticle surface before incorporation into the resin. The amount of surface modifier is dependent upon several factors such as particle size, particle type, modifier molecular weight and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

In some embodiments, inorganic nanoparticle comprises at least one copolymerizable silane surface treatment. Suitable (meth)acryl organosilanes include for example (meth) acryloyl alkylene alkoxy silanes such as 3-(methacryloyloxy)-propyltrimethoxysilane, 3-acryloylxypropyltrimethoxysilane, 3-(methacryloyloxy)propylmethyldimethoxysilane, 3-(acryloyloxypropyl)methyl dimethoxysilane, 3-(methacryloyloxy)propyldimethylmethoxysilane, and 3-(acryloyloxypropyl) dimethylmethoxysilane. Suitable vinyl silanes include vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane. Suitable amino organosilanes are described for example in US2006/0147177.

The inorganic nanoparticle may further comprise various other surface treatments, as known in the art.

The (e.g. hardcoat) composition may optionally comprise various additives. For example, silicone or fluorinated additive may be added to lower the surface energy of the composition.

The composition may be polymerized with either a thermal initiator or photoinitiator. Any conventional free radical initiator may be used to generate the initial radical. Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, Del.) under the VAZO trade designation including VAZO™ 67 (2,2'-azo-bis(2-methybutyronitrile)) VAZO™ 64 (2,2'-azo-bis(isobutyronitrile)) and VAZO™52 (2,2'-azo-bis(2,2-dimethyvaleronitrile)), and Lucidol™ 70 from Elf Atochem North America, Philadelphia, Pa.

Useful photoinitiators include benzoin ethers such as benzoin methyl ether and benzoin isopropyl ether; substituted acetophenones such as 2,2-dimethoxyacetophenone, available as Irgacure™ 651 photoinitiator (Ciba Specialty Chemicals), 2,2 dimethoxy-2-phenyl-1-phenylethanone, available as Esacure™ KB-1 photoinitiator (Sartomer Co.; West Chester, PA), and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime.
Particularly preferred among these are the substituted acetophenones.

The initiator is used in an amount effective to facilitate free radical addition to the addition-fragmentation crosslinking agent and the amount will vary depending upon, e.g., the type of initiator, and the molecular weight of the polymer and the degree of functionalization desired. The initiators can be used in amounts from about 0.001 part by weight to about 5 parts by weight based on 100 parts total monomer, oligomer, and polymer.

The polymerizable (e.g. hardcoat) compositions can be formed by dissolving the (e.g. free-radically polymerizable) ethylenically unsaturated monomers, oligomers, and polymers in a compatible organic solvent and then combined with the nanoparticle dispersion. A single organic solvent or a blend of solvents can be employed. Depending on the ethylenically unsaturated material(s), suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; aromatic hydrocarbons such as toluene; isophorone; butyrolactone; N-methylpyrrolidone; tetrahydrofuran; esters such as lactates, acetates, including propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

In another embodiment, a method of forming a coated substrate comprising is described comprising applying a polymerizable (e.g. hardcoat) composition to a surface of a substrate; and polymerizing the ethylenically unsaturated polymerizable groups. The polymerizable (e.g. hardcoat) composition comprises at least one monomer, oligomer, polymer, or a combination thereof comprising ethylenically unsaturated groups; optionally inorganic particulate material; and at least one cyclic imide monomer comprising an α, β-unsaturated carbonyl, as described herein.

The (e.g. hardcoat) coating composition can be applied as a single or multiple layers to a (e.g. display surface or film) substrate using conventional film application techniques. Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature. Although it is usually convenient for the substrate to be in the form of a roll of continuous web, the coatings may be applied to individual sheets.

The (e.g. hardcoat) coating composition is dried in an oven to remove the solvent and then cured at room temperature, elevated temperature, upon exposure to radiant energy, or a combination thereof. In one embodiment, the (e.g. hardcoat) coating composition is cured by exposure to ultraviolet radiation using an H-bulb or other lamp at a desired wavelength, preferably in an inert atmosphere (less than 50 parts per million oxygen). The reaction mechanism causes the free-radically polymerizable materials to crosslink.

The thickness of the cured (e.g. hardcoat) surface layer is typically at least 0.5 microns, 1 micron, or 2 microns. The thickness of the surface layer is generally no greater than 50 microns or 25 microns. Preferably the thickness ranges from about 5 microns to 15 microns.

Due to its optical clarity, the (e.g. hardcoat) composition described herein is particularly useful for application to light-transmissive film substrates or optical displays. The light transmissive substrate may comprise or consist of any of a wide variety of inorganic materials, such as glass, or various thermoplastic and crosslinked organic polymeric materials, such as polyethylene terephthalate (PET), (e.g. bisphenol A) polycarbonate, cellulose acetate, poly(methyl methacrylate), and polyolefins such as biaxially oriented polypropylene which are commonly used in various optical devices. Further, the substrate may comprise a hybrid material, having both organic and inorganic components. The substrate and cured (e.g. hardcoat) surface layer have a transmission of at least 80%, at least 85%, and preferably at least 90%. The initial haze (i.e. prior to abrasion testing) of the substrate and cured (e.g. hardcoat) surface layer can be less than 1 or 0.5, or 0.4, or 0.2%.

The substrate thicknesses is typically at least 20 microns and no greater than about 0.5 mm. In some embodiments, the thickness of the substrate is no greater than 250, 200, 150, or 100 microns. Self-supporting polymeric films are preferred. The polymeric material can be formed into a film using conventional filmmaking techniques such as by extrusion and optional uniaxial or biaxial orientation of the extruded film. The substrate can be treated to improve adhesion between the substrate and the adjacent layer, e.g., chemical treatment, corona treatment such as air or nitrogen corona, plasma, flame, or actinic radiation. If desired, an optional tie layer or primer can be applied to the substrate to increase the interlayer adhesion with the cured (e.g. hardcoat) composition.

The volume shrinkage and polymerization stress of the cured polymerizable composition can be detected with various methods, some of which are described in WO2012/112304.

When a (e.g. hardcoat) composition is applied, dried, and cured on a substrate, the volume shrinkage and polymerization stress causes the coated (e.g. 5 mil PET) film substrate to curl. The total curl can be determined by the height of the four corners (as described in greater detail in the examples.) It is appreciated that the curing conditions and thickness of the hardcoat can also affect the total curl. Thus, the same control hardcoat composition, lacking a cyclic imide as described herein, can exhibit different total curl values. In one embodiment, the total curl of the control was 31 mm, yet the total curl of the same hardcoat composition comprising a cyclic imide monomer as described herein was 28 mm or 16 mm. This represents an improvement of at least 10, 15, 20, 25, 30, 35, 40, or 45% (e.g. (31−16/31=48%). Other embodiments also demonstrate a decrease in total curl and a percent improvement relative to a control in the same range.

In typical embodiments, the inclusion of the cyclic imide monomer(s) reduces the polymerization stress without diminishing the mechanical properties of the cured composition. In the case of the exemplified hardcoat, the cured hardcoat with and without the inclusion of the cyclic imide monomer(s) has about the same pencil hardness, i.e. a pencil hardness of at least 3H.

Unless stated otherwise, the following definitions are applicable to the detailed description:

"acryloyl" is used in a generic sense and mean not only derivatives of acrylic acid, but also amine, and alcohol derivatives, respectively;

"(meth)acryl" mean acryl and methacryl groups; and is inclusive of both esters and amides.

"curable" means that a coatable material can be transformed into a solid, substantially non-flowing material by means of free-radical polymerization, chemical cross linking, radiation crosslinking, or the like.

"alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent, i.e. monovalent alkyl or polyvalent alkylene.

"heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent, i.e. monovalent heteroalkyl or polyvalent heteroalkylene.

"(hetero)alkyl" means alkyl and heteroalkyl.

"aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl.

"heteroaryl" is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent, i.e. monovalent aryl or polyvalent arylene.

"(hetero)aryl" means aryl and heteroaryl.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Missouri, or may be synthesized by known methods. Table 1 (below) lists materials used in the examples and their sources.

TABLE 1

Materials List

| DESIGNATION | DESCRIPTION | SOURCE |
| --- | --- | --- |
| Cyclohexane | Cyclohexane | EMD Chemicals, Inc., Gibbstown, NJ, USA |
| Hexane | Hexane | EMD Chemicals, Inc. |
| Dichloromethane | Dichloromethane | EMD Chemicals, Inc. |
| Ethyl acetate | Ethyl acetate | EMD Chemicals, Inc. |
| Acetic anhydride | Acetic anhydride | EMD Chemicals, Inc. |
| Glycidyl methacrylate | Glycidyl methacrylate | Alfa Aesar, Haverhill, MA, USA |
| Dibutyltin dilaurate | Dibutyltin dilaurate | Alfa Aesar |
| IEM | 2-isocyanatoethyl methacrylate | TCI Chemicals, Tokyo, Japan |

TABLE 1-continued

Materials List

| DESIGNATION | DESCRIPTION | SOURCE |
| --- | --- | --- |
| Methyl methacrylate oligomer mixture | | Prepared as described below. |
| Potassium hydroxide | KOH | Sigma Aldrich, St. Louis, MO, USA |
| Methyl methacrylate dimer | | Prepared as described below. |
| Concentrated HCl | Hydrochloric acid | Sigma Aldrich |
| Diacid 1 | 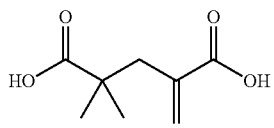 | Prepared as described below. |
| Anhydride 2 | 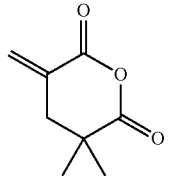 | Prepared as described below. |
| β-alanine | Beta-alanine | Sigma Aldrich |
| Ph$_3$P | Triphenyl phosphine, P(C$_6$H$_5$)$_3$ | Sigma Aldrich |
| Ph$_3$Sb | Triphenyl antimony, (C$_6$H$_5$)$_3$Sb | Sigma Aldrich |
| 6-amino caproic acid | H$_2$N(CH$_2$)$_5$CO$_2$H | Sigma Aldrich |
| 12-aminododecanoic acid | NH$_2$(CH$_2$)$_{11}$COOH | Sigma Aldrich |
| 3-amino-1-propanol | HO(CH$_2$)$_3$NH$_2$ | Sigma Aldrich |
| 5-amino-1-pentanol | HO(CH2)$_5$NH$_2$ | Alpha Aesar |
| 3-amino-1,2-propanediol | NH$_2$CH$_2$CH(OH)CH$_2$OH | Sigma Aldrich |
| Silica sol | 41.33 wt. % 20 nanometer nanosilica methoxy propanol, obtained under the trade designation "NALCO 2329 k" | Nalco Company, Naperville, IL, USA |
| 1-methoxy-2-propanol | CH$_3$OCH$_2$CH(CH$_3$)OH | Alpha Aesar |
| Prostab | Hydroxy TEMPO | Sigma Aldrich |
| 3-methacryloxy propyl trimethoxysilane | (MeO)$_3$SiCH$_2$CH$_2$OC(O)C(CH$_3$)CH$_2$ | Sigma Aldrich |
| Pentaerythritol triacrylate | (H$_2$C=CHCO$_2$CH$_2$)$_3$CCH$_2$OH | Sigma Aldrich |
| IRG651 | UV photoinitiator obtained under the trade designation "IRGACURE 651" | BASF, Ludwigshafen, Germany |
| 1,6-diaminohexane | H$_2$N(CH$_2$)$_6$NH$_2$ | Sigma Aldrich |
| 1,8-diaminooctane | NH$_2$(CH$_2$)$_8$NH$_2$ | Sigma Aldrich |
| 1,12-Diaminododecane | NH$_2$(CH$_2$)$_{12}$NH$_2$ | Sigma Aldrich |
| BHT | Butylated hydroxytoluene | Sigma Aldrich |

Test Methods

Film Curl Test Method

The film curl was measured on a 7.6 centimeter (cm)×7.6 cm square sample that was cut from the center of a coated film. The sample was placed on a flat surface, and the height of each corner was measured using a ruler. The total curl was determined by summing the height of the four corners.

Film Thickness Test Method

The film thickness was measured at each corner of the 7.6 cm×7.6 cm square and in the middle of each side (eight measurements total) using a dial gage (Mitutoyo Digital Dial Gauge, Model ID-F125E, Mitutoyo Corp.; Aurora, IL). The average film thickness was calculated using these eight measurements.

Pencil Hardness Test Method

The pencil hardness was measured on each hard coat using an Elcometer 3086 motorized pencil hardness tester (obtained from Elcometer Inc. of Rochester Hills, MI) with a 7.5 N load following ASTM D3363.

Cyclic Imide Addition-Fragmentation Monomer Synthesis

General Procedures. All reactions were performed in round-bottomed flasks or glass jars/vials using unpurified commercial reagents.

Instrumentation. Proton nuclear magnetic resonance ($^1$H NMR) spectra and carbon nuclear magnetic resonance ($^{13}$C NMR) spectra were recorded on a 500 MHz spectrometer.

Distillation of Methyl Methacrylate Oligomer Mixture

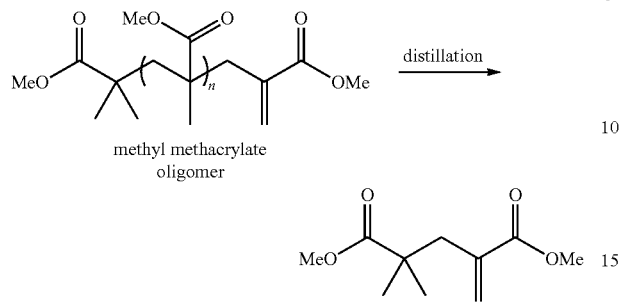

methyl methacrylate oligomer

A methyl methacrylate oligomer mixture was prepared according to the procedure described in Example 1 of U.S. Pat. No. 4,547,323 (Carlson, G. M.). The mixture was distilled as described in Moad, C. L.; Moad, G.; Rizzardo, E.; and Thang, S. H. Macromolecules, 1996, 29, 7717-7726, with details as follows:

A 1 liter (L) round-bottomed flask equipped with a magnetic stir bar was charged with 500 grams (g) of methyl methacrylate oligomer mixture. The flask was fitted with a Vigreux column, a condenser, a distribution adapter, and four collection flasks. With stirring, the distillation was placed under reduced pressure (0.25 mm Hg). The oligomer mixture was stirred under reduced pressure at room temperature until gas evolution (removal of methyl methacrylate monomer) had largely subsided. The distillation pot was then heated to reflux in an oil bath to distill the oligomer mixture at reduced pressure to provide the desired dimer.

Hydrolysis of Methyl Methacrylate Dimer

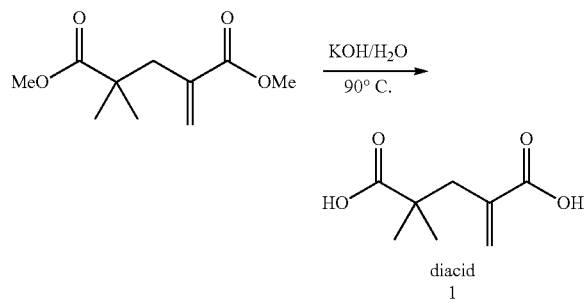

diacid 1

The dimer was hydrolyzed to diacid 1 as described in Hutson, L.; Krstina, J.; Moad, G.; Morrow, G. R.; Postma, A.; Rizzardo, E.; and Thang, S. H. Macromolecules, 2004, 37, 4441-4452, with details as follows:

Diacid 1. A 1 L, round-bottomed flask equipped with a magnetic stir bar was charged with deionized (DI) water (302 milliliters (mL)) and potassium hydroxide (90.46 g, 1612 millimole (mmol)). The mixture was stirred until homogeneous. Methyl methacrylate dimer (120.0 g, 599.3 mmol) was added. The reaction was equipped with a reflux condenser and was heated to 90° C. in an oil bath. After 17 hours, the reaction was removed from the oil bath and was allowed to cool to room temperature. The reaction solution was acidified to pH~0 using concentrated HCl. A white precipitate formed upon acidification. The heterogeneous mixture was vacuum filtered and the white solid was washed quickly with DI water (twice with 50-100 mL). The white solid was then recrystallized from DI water (220 mL). The recrystallized solid was collected via vacuum filtration using a Buchner funnel. The collected solids were then quickly washed with DI water (twice with 50 mL). The solid was further dried under high vacuum to provide diacid 1 (86.67 g, 503.4 mmol, 84%) as a fine white solid.

Preparation of Cyclic Imide Monomers

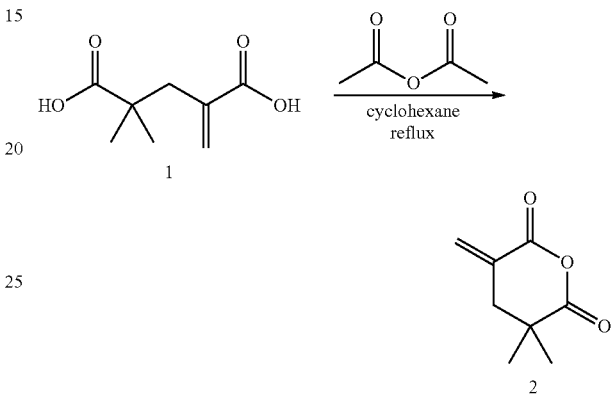

Anhydride 2. A 1 L round-bottomed flask equipped with a magnetic stir bar was charged with diacid 1 (50.00 g, 290.4 mmol), cyclohexane (500 mL), and acetic anhydride (73.30 mL, 79.16 g, 775.4 mmol). The reaction flask was equipped with a Dean-Stark trap and a reflux condenser. With, stirring, the reaction was heated to reflux in an oil bath. The solution was refluxed for 2 hours during which approximately 200 mL of colorless liquid was removed from the Dean-Stark trap. After 2 hours, the reaction was removed from the oil bath and was allowed to cool to room temperature. A white solid precipitated out of solution as it cooled. The precipitate was collected via vacuum filtration using a Buchner funnel and was quickly washed with cyclohexane (75 mL). The white solid was then recrystallized from cyclohexane (400 mL). The recrystallized solid was collected via vacuum filtration using a Buchner funnel and was washed with cyclohexane (2×75 mL). The solid was further dried under high vacuum to provide anhydride 2 (34.83 g, 225.9 mmol, 78%) as a white crystalline solid.

Methacrylate-functionalized addition-fragmentation cyclic imide monomers (CIMs) CIM-2, CIM-4, and CIM-6 were prepared (Table A) from the corresponding carboxylic acid-functionalized cyclic imides and glycidyl methacrylate (Reaction Scheme 6). Acid functional imides CIM-1, CIM-3, and CIM-5 (Table A) were prepared through condensation of the corresponding amino acid and a cyclic anhydride prepared from a methacrylate dimer (Reaction Scheme 5).

Methacrylate-functionalized addition-fragmentation cyclic imide monomers (CIMs) CIM-8 and CIM-10 and acid functional imides CIM-7, CIM-9, and CIM-11 were also prepared similarly to Reaction Scheme 6 utilizing hydroxyl-functional amines, 3-amino-1-propanol, 5-amino-1-pentanol, 3-amino-1,2-propanediol. For some compounds the hydroxyl group was reacted with 2-isocyanatoethyl methacrylate.

The structures of the synthesized addition-fragmentation cyclic imide monomers are depicted in Table A.

CIM-1. An approximately 40 mL amber glass bottle equipped with a magnetic stir bar was charged with anhydride 2 (15.00 g, 97.30 mmol) and β-alanine (8.668 g, 97.30 mmol). The two solid reagents were mixed well using a wooden applicator. The reaction was sealed with a Teflon-lined plastic cap. With stirring, the mixture was heated to 125° C. in an oil bath. After 4 hours, the reaction was removed from the oil bath, the cap was removed, and the reaction mixture was allowed to cool to room temperature open to the atmosphere. The crude product mixture was purified by filtering twice through a plug of silica gel (~4 cm wide by 10 cm tall) using a 50:50 mixture of hexane and ethyl acetate as eluent to provide CIM-1 (13.835 g, 61.42 mmol, 63%) as a white solid. $^1$H NMR analysis was consistent with the desired product.

CIM-2. An approximately 8 mL amber glass vial equipped with a magnetic stir bar was charged with CIM-1 (2.00 g, 8.879 mmol) and glycidyl methacrylate (1.262 g, 8.878 mmol), and triphenyl antimony (0.0188 g, 0.0532 mmol). The reaction was sealed with a Teflon-lined plastic cap. With stirring, the mixture was heated to 100° C. in an oil bath. After 18 hours, triphenyl phosphine (0.0046 g, 0.0178 mmol) was added. The reaction was kept stirring at 100° C. After an additional 9 hours, the reaction was sampled and $^1$H NMR analysis was consistent with the desired product as a mixture of isomers. The reaction was cooled to room temperature to provide CIM-2 (3.224 g, 8.775 mmol, 99%) as a clear, colorless viscous oil.

CIM-3. An approximately 80 mL amber glass bottle equipped with a magnetic stir bar was charged with anhydride 2 (15.00 g, 97.30 mmol) and 6-amino caproic acid (12.764 g, 97.30 mmol). The two solid reagents were mixed well using a wooden applicator. The reaction was sealed with a Teflon-lined plastic cap. With stirring, the mixture was heated to 125° C. in an oil bath. After 4 hours, the reaction was removed from the oil bath, the cap was removed, and the reaction mixture was allowed to cool to room temperature open to the atmosphere. The crude product mixture was purified by filtering twice through a plug of silica gel (~4 cm wide by 10 cm tall) using a 50:50 mixture of hexane and ethyl acetate as eluent for the first filtration and 75:25 hexane and ethyl acetate as eluent for the second filtration to provide CIM-3 (14.606 g, 54.64 mmol, 56%) as a white solid. $^1$H NMR analysis was consistent with the desired product.

CIM-4. An approximately 20 mL glass vial equipped with a magnetic stir bar was charged with CIM-3 (2.22 g, 8.305 mmol) and glycidyl methacrylate (1.180 g, 8.301 mmol), and triphenyl antimony (0.0176 g, 0.0498 mmol). The reaction was sealed with a Teflon-lined plastic cap. With stirring, the mixture was heated to 100° C. in an oil bath. After 18 hours, triphenyl phosphine (0.0044 g, 0.0166 mmol) was added. The reaction was kept stirring at 100° C. After an additional 9 hours, the reaction was cooled to room temperature and sampled. $^1$H NMR analysis revealed a small amount of unreacted epoxide. The reaction was reheated to 100° C. After 6 hours, the reaction was cooled to room temperature and sampled. $^1$H NMR analysis revealed a small amount of unreacted epoxide. The reaction was reheated to 100° C. After 23 hours, the reaction was cooled to room temperature and sampled. $^1$H NMR analysis was consistent with the desired product as a mixture of isomers. The reaction provided CIM-4 (3.359 g, 8.203 mmol, 99%) as a pale yellow viscous oil.

CIM-5. An approximately 80 mL glass bottle equipped with a magnetic stir bar was charged with anhydride 2 (10.00 g, 64.87 mmol) and 12-aminododecanoic acid (13.968 g, 64.87 mmol). The two solid reagents were mixed well using a wooden applicator. The reaction vessel was then capped with a screw-on vacuum adapter left open to the atmosphere. With stirring, the mixture was heated to 125° C. in an oil bath. After 50 minutes, the reaction was placed under vacuum (~0.3 mm Hg) After 4 hours, the reaction was removed from the oil bath, the cap was removed, and the reaction mixture was allowed to cool to room temperature open to the atmosphere. The crude product mixture was taken up in dichloromethane (100 mL) and then vacuum filtered via Buchner funnel to remove insoluble material. The filtered dichloromethane solution was concentrated in vacuo. The residue was redissolved in a 60:40 mixture of hexane and ethyl acetate and purified by filtering through a plug of silica gel (~4 cm wide by 10 cm tall) using a 60:40 mixture of hexane:ethyl acetate as eluent. The filtered solution was then concentrated in vacuo. The silica gel filtration was repeated twice more to provide CIM-5 (11.910 g, 33.89 mmol, 52%) as a clear, colorless, viscous oil. $^1$H NMR analysis was consistent with the desired product.

CIM-6. An approximately 20 mL glass vial equipped with a magnetic stir bar was charged with CIM-5 (5.000 g, 14.23 mmol) and glycidyl methacrylate (2.02 g, 14.21 mmol), and triphenyl antimony (0.0301 g, 0.0852 mmol). The reaction was sealed with a Teflon-lined plastic cap. With stirring, the mixture was heated to 100° C. in an oil bath. After 24 hours, triphenyl phosphine (0.0075 g, 0.0286 mmol) was added. The reaction was kept stirring at 100° C. After an additional 18 hours, the reaction was sampled and $^1$H NMR analysis was consistent with the desired product as a mixture of isomers. The reaction was cooled to room temperature to provide CIM-6 (7.012 g, 14.20 mmol, 100%) as a viscous yellow oil.

CIM-7. An approximately 240 mL amber glass bottle with Teflon-wrapped threads and equipped with a magnetic stir bar was charged with anhydride 2 (25.00 g, 162.2 mmol) and then placed in a room-temperature water bath. Next, 3-amino-1-propanol (12.3 mL, 12.18 g, 162.2 mmol) was added over 5 minutes. The bottle was then equipped with a lid adapted to apply vacuum. The bottle was placed in a 125° C. oil bath and stirred. After 30 minutes at 125° C., the reaction was placed under vacuum. After an additional 4 hours, the reaction was backfilled with nitrogen and allowed to cool to room temperature to provide a clear yellow viscous liquid. The reaction was opened to the atmosphere and dissolved in a 90:10 mixture of dichloromethane and ethyl acetate. The crude product mixture was purified by filtering twice through a plug of silica gel (~7.5 cm wide by 15 cm tall) using a 90:10 mixture of dichloromethane and ethyl acetate as eluent. The eluent was concentrated in vacuo to a colorless oil. The crude product mixture was further purified by filtering twice more through a plug of silica gel (~7.5 cm wide by 15 cm tall) using a 90:10 mixture of dichloromethane and ethyl acetate as eluent for the first filtration and a gradient from 95:5 to 90:10 mixture of dichloromethane and ethyl acetate as eluent to provide CIM-7 (11.13 g, 52.68 mmol, 32%) as a colorless oil. $^1$H NMR analysis was consistent with the desired product.

CIM-8. An approximately 30 mL glass vial equipped with a magnetic stir bar was charged with CIM-7 (3.00 g, 14.2 mmol) and 2-isocyanatoethyl methacrylate (2.01 mL, 2.20 g, 14.2 mmol), and one drop of dibutyltin dilaurate from a pipette tip. The reaction was sealed with a Teflon-lined plastic cap. With stirring, the mixture was heated to 50° C.

in an oil bath. After 48 hours, the reaction was sampled and ¹H NMR analysis was consistent with the desired product. The reaction was cooled to room temperature to provide CIM-8 (4.946 g, 14.11 mmol, 99%) as a clear, colorless viscous oil.

CIM-9. An approximately 240 mL amber glass bottle with Teflon-wrapped threads and equipped with a magnetic stir bar was charged with anhydride 2 (25.00 g, 162.2 mmol) and then placed in a room-temperature water bath. Next, 5-amino-1-pentanol (17.5 mL, 16.7 g, 162.2 mmol) was added over 10 minutes. The bottle was placed in a 125° C. oil bath with stirring and open to the atmosphere. After 30 minutes, the bottle was equipped with a lid adapted to apply vacuum and the reaction was placed under vacuum. After an additional 3.5 hours, the reaction allowed to cool to room temperature and opened to the atmosphere to provide a clear yellow sticky material. The reaction was opened to the atmosphere and dissolved in a 90:10 mixture of dichloromethane and ethyl acetate. The crude product mixture was purified by filtering four times through a plug of silica gel (~2.5 cm wide by 12.5 cm tall) using a 90:10 mixture of dichloromethane and ethyl acetate as eluent. After the final silica gel plug filtration, the eluent was concentrated in vacuo to a colorless viscous oil. This oil was further dried by bubbling air through the material using an 18 gauge needle to provide CIM-9 (11.91 g, 49.78 mmol, 31%) as a clear, colorless viscous liquidly. ¹H NMR analysis was consistent with the desired product.

CIM-10. An approximately 30 mL glass vial equipped with a magnetic stir bar was charged with CIM-9 (5.00 g, 20.9 mmol) and 2-isocyanatoethyl methacrylate (2.95 mL, 3.24 g, 20.9 mmol), and one drop of dibutyltin dilaurate from a pipette tip. The reaction was sealed with a Teflon-lined plastic cap. With stirring, the mixture was heated to 50° C. in an oil bath. After 168 hours, the reaction was sampled and ¹H NMR analysis was consistent with the desired product. The reaction was cooled to room temperature to provide CIM-10 (8.199 g, 20.78 mmol, 99%) as a clear, colorless viscous liquid.

CIM-11. An approximately 240 mL glass bottle with Teflon-wrapped threads and equipped with a magnetic stir bar was charged with anhydride 2 (25.00 g, 162.2 mmol) and (+/−) 3-amino-1,2-propanediol (14.78 g, 162.2 mmol). The bottle was then equipped with a lid adapted to apply vacuum. The bottle was placed in a 125° C. oil bath and stirred. After 15 minutes at 125° C., the reaction was placed under active vacuum. The active vacuum was shut off and the reaction was left under static vacuum for 5 minutes and then placed briefly back under active vacuum. This was sequence was repeated twice more and then the reaction was left under static vacuum with stirring at 125° C. for 4 hours. The reaction was then backfilled with nitrogen and allowed to cool to room temperature to provide a yellow/orange glass solid. The crude reaction product was dissolved in dichloromethane with the aid of sonication for 30 minutes. The crude product mixture was then by filtered through a plug of silica gel (~12.5 cm wide by 7.5 cm tall) using a 97:3 mixture of dichloromethane and methanol as eluent. The eluent was concentrated in vacuo to a colorless viscous liquid. The crude product mixture was once more filtered through a plug of silica gel (~12.5 cm wide by 7.5 cm tall) using a 95:05 mixture of dichloromethane and methanol as eluent to provide CIM-11 (11.87 g, mmol, 32%) as a colorless oil. ¹H NMR analysis was consistent with the desired product.

Nanoparticle Fillers Functionalized with 3-Methacryloxy Propyl Trimethoxysilane

Compositions were prepared having the components shown in Table 2 according to the following procedure:

100 grams (g) of silica sol (Nalco 2329 k sol; 41.33 wt. %) was added to a 16 ounce (470 mL) glass bottle with Teflon-wrapped threads and stirred with a magnetic stir bar. A solution was prepared by mixing methoxy propanol (112.5 g), Prostab (0.0250 g of a 0.05 wt. % solution in water), and 3-methacryloxy propyl trimethoxysilane (6.36 g) in a 230 mL amber glass bottle. This mixture was then added to the silica sol with stirring over approximately 5 minutes.

The 16 ounce glass jar was then sealed with a Teflon-lined metal cap, Teflon tape, and electrical tape. The reaction was heated to 90° C. with stirring. After approximately 18 hours, the reaction mixture was transferred to a 500 mL round-bottomed flask and concentrated to approximately 45 wt % solids in vacuo (approximately half the original volume). Approximately 110 grams of methoxy propanol was added to lower the solids back to approximately 20 wt. %. The solution was then concentrated again to approximately 45 wt. % functionalized nanoparticle solids (about 100 mL) in vacuo.

The wt. % solids of each example was determined by adding approximately 0.250 g of the final solution to an aluminum pan and drying in an oven set at 125° C. for 45 minutes. The sample was then removed from the oven, allowed to cool to room temperature, and the mass of the dried sample was measured and used to calculate percent solids in the nanoparticle solution. The functionalized nanoparticle compositions are suitable as fillers in resin compositions.

TABLE 2

Nanoparticle Functionalization

| Component | EX NP-1 | EX NP-2 |
|---|---|---|
| Silica sol, g | 100 | 100 |
| Methoxy propanol, g | 112.5 | 112.5 |
| 3-methacryloxy propyl trimethoxysilane, g | 6.36 | 6.36 |
| Prostab (0.05 wt. % solution in water), g | 0.025 | 0.025 |
| Final wt. % solids | 50.0 | 46.6 |

Hardcoats Prepared from CIM-2

Hard coat solutions were prepared by combining the methoxy propanol solution of functionalized silica nanoparticles from Example NP-1, pentaerythritol triacrylate, IRG651 in the amounts shown in Table 3 in a 20 mL glass vial. Methoxy propanol was added to bring the weight percent solids of the solution to 50 percent. The solutions were mixed well and sonicated for 2-5 minutes.

TABLE 3

Hardcoat Formulations with CIM-2

| Component | % solids | A (Control) | B | C |
|---|---|---|---|---|
| Nanoparticle composition of EX NP-1, g | 50.0 | 4.997 | 4.997 | 4.997 |
| CIM-2, g | 100 | 0 | 0.101 | 0.201 |
| Pentaerythritol Triacrylate, g | 100 | 2.45 | 2.349 | 2.249 |
| IRG651, g | 100 | 0.05 | 0.05 | 0.05 |
| Additional Methoxy Propanol, g | | 2.503 | 2.503 | 2.503 |

The solutions were coated onto 6 inch×14 inch (15 cm×35 cm) sheets of 5 mil (0.13 mm) thick PET film (prepared as described in Example 29 of U.S. Pat. No. 6,893,731 (Kausch)), using a #12 wire-wound rod (obtained from RD Specialties, Webster, NY). The coated samples were dried in an oven set at 75° C. for 30 minutes. The coated films were then cured by irradiating with UV light (878 mJ/cm$^2$, UVB) using a UV processor (Fusion UV System, Inc., Gaithersburg, MD) equipped with an H-bulb and operated under nitrogen atmosphere at a line speed of 24 feet/min (2 passes) to provide hard coats on the PET film.

After irradiation, the coated films were measured for film curl, hard coat thickness, and pencil hardness. Results are shown in Tables 4, 5, and 6.

TABLE 4

Hardcoat Curl (CIM-2)

| Example | A (Control) | B | C |
|---|---|---|---|
| Corner Heights, mm | 1.0 | 2.0 | 1.5 |
| | 14.5 | 14.0 | 6.5 |
| | 1.0 | 1.0 | 2.0 |
| | 14.5 | 11.0 | 6.0 |
| Total corner height, mm | 31.0 | 28.0 | 16.0 |
| Relative to Control, % | 100 | 90.3 | 51.6 |

TABLE 5

Hardcoat Thickness (CIM-2)

| Example | A (Control) | B | C |
|---|---|---|---|
| Average Thickness, micrometers | 7.1 | 7.3 | 7.3 |
| SD, micrometers | 0.4 | 0.5 | 0.5 |
| Relative to Control, % | 100 | 101.8 | 101.8 |

TABLE 6

Hardcoat Pencil Hardness (CIM-2)

| Example | A (Control) | B | C |
|---|---|---|---|
| Hardness | 3H | 3H | 3H |

Hardcoats Prepared from CIM-4

Solutions for samples prepared from CIM-4 were prepared as described above, only were cured by irradiating with UV light (830 mJ/cm$^2$, UVB) using a UV processor (Fusion UV System, Inc., Gaithersburg, MD) equipped with an H-bulb and operated under nitrogen atmosphere at a line speed of 24 feet/min (2 passes) to provide hard coats on the PET film.

Films were measure for film curl, hard coat thickness, and pencil hardness as described above.

TABLE 7

Hardcoat Formulations with CIM-4

| Component | % solids | D (Control) | E | F |
|---|---|---|---|---|
| Nanoparticle composition of EX NP-1, g | 50.0 | 4.997 | 4.997 | 4.997 |
| CIM-4, g | 100 | 0 | 0.045 | 0.112 |
| Pentaerythritol Triacrylate, g | 100 | 2.45 | 2.405 | 2.338 |
| IRG651, g | 100 | 0.05 | 0.05 | 0.05 |
| Additional Methoxy Propanol, g | | 2.503 | 2.503 | 2.503 |

TABLE 8

Hardcoat Curl (CIM-4)

| Example | D (Control) | E | F |
|---|---|---|---|
| Corner Heights, mm | 16.0 | 16.5 | 12.0 |
| | 16.0 | 14.0 | 13.0 |
| | 1.5 | 1.0 | 1.0 |
| | 1.5 | 1.0 | 1.0 |
| Total corner height, mm | 35.0 | 32.5 | 27.0 |
| Relative to Control, % | 100 | 92.9 | 77.1 |

TABLE 9

Hardcoat Thickness (CIM-4)

| Example | D (Control) | E | F |
|---|---|---|---|
| Avg Thickness, micrometers | 7.1 | 7.9 | 7.8 |
| SD, micrometers | 0.4 | 0.6 | 0.5 |
| Relative to Control, % | 100 | 110.5 | 108.8 |

TABLE 10

Hardcoat Pencil Hardness (CIM-4)

| Example | D (Control) | E | F |
|---|---|---|---|
| Hardness | 3H | 3H | 3H |

Bis Cyclic Imide Addition-Fragmentation Monomer Synthesis

Preparation of BCIM Monomers

Bis-cyclic imide monomers (BCIMs) BCIM-1, BCIM-2, and BCIM-3 that vary in chain length between the cyclic imide ends were prepared (Table A). The bis-imide monomers were prepared by cyclizing diacid 1 to anhydride 2 using acetic anhydride. Cyclic anhydride 2 was then condensed with the appropriate diamine to provide the bis-cyclic imide monomers (Reaction Scheme 7). The structures of the synthesized addition-fragmentation bis-cyclic imide monomers are depicted in Table A.

BCIM-1. An approximately 40 mL glass bottle equipped with a magnetic stir bar was charged with anhydride 2 (34.52 g, 223.92 mmol) and 1,6-diaminohexane (13.02 g, 111.96 mmol). The two solid reagents were mixed well using a wooden applicator. The reaction vessel was then capped with a screw-on vacuum adapter and placed under a nitrogen atmosphere. With stirring, the mixture was heated to 125° C. in an oil bath. After 20 minutes, the reaction was placed under vacuum (~0.3 mm Hg). After an additional 3 hours, the reaction was removed from the oil bath, the cap was removed, and the reaction mixture was allowed to cool to room temperature open to the atmosphere. The crude product mixture was taken up in dichloromethane (75 mL) and was filtered through a plug of silica gel (~4 cm wide by 10 cm tall) using an 80:20 mixture of hexane:ethyl acetate as eluent. The filtered solution was concentrated in vacuo. The silica gel filtration was repeated 5 more times. The product was then dried under high vacuum to provide BCIM-1 (8.3594 g, 21.52 mmol, 19.2%) as a white solid. $^1$H NMR analysis was consistent with the desired product.

BCIM-2. An approximately 40 mL glass bottle equipped with a magnetic stir bar was charged with anhydride 2 (10.00 g, 64.87 mmol) and 1,8-diaminooctane (4.679 g, 32.43 mmol). The two solid reagents were mixed well using a wooden applicator. The reaction vessel was then capped with a screw-on vacuum adapter. The flask was connected to a high vacuum line, but was left at atmospheric pressure. With stirring, the mixture was heated to 125° C. in an oil bath. After 35 minutes, the reaction was placed under vacuum (~0.3 mm Hg). After an additional 4 hours, the reaction was removed from the oil bath, the cap was removed, and the reaction mixture was allowed to cool to room temperature open to the atmosphere. The crude product mixture was taken up in dichloromethane (75 mL) and then vacuum filtered via Buchner funnel to remove insoluble material. The filtered dichloromethane solution was concentrated in vacuo. The residue was redissolved in dichloromethane and purified by filtering through a plug of silica gel (~4 cm wide by 10 cm tall) using dichloromethane as eluent. The filtered solution was then concentrated in vacuo. The silica gel filtration was repeated twice more. The product was then dried under high vacuum and further dried by bubbling air through the clear, colorless viscous liquid. The product solidified upon standing to provide BCIM-2 (2.6390 g, 6.335 mmol, 19.5%) as a white solid. $^1$H NMR analysis was consistent with the desired product.

BCIM-3. An approximately 40 mL glass bottle equipped with a magnetic stir bar was charged with anhydride 2 (10.00 g, 64.87 mmol) and 1,12-diaminododecane (6.4987 g, 32.44 mmol). The two solid reagents were mixed well using a wooden applicator. The reaction vessel was then capped with a screw-on vacuum adapter and placed under a nitrogen atmosphere. With stirring, the mixture was heated to 125° C. in an oil bath. After 50 minutes, the reaction was placed under vacuum (~0.3 mm Hg). After an additional 5 hours, the reaction was removed from the oil bath, the cap was removed, and the reaction mixture was allowed to cool to room temperature open to the atmosphere. The crude product mixture was taken up in dichloromethane (75 mL) and then vacuum filtered via Buchner funnel to remove insoluble material. The filtered dichloromethane solution was concentrated in vacuo. The residue was redissolved in an 80:20 mixture of hexane and ethyl acetate and purified by filtering through a plug of silica gel (~4 cm wide by 10 cm tall) using an 80:20 mixture of hexane:ethyl acetate as eluent. The filtered solution was concentrated in vacuo. The residue was redissolved in dichloromethane and purified by filtering through a plug of silica gel (~4 cm wide by 10 cm tall) using dichloromethane as eluent. The filtered solution was then concentrated in vacuo. The silica gel filtration was repeated once more using dichloromethane as eluent. The product was then dried under high vacuum and further dried by bubbling air through the clear, colorless viscous liquid. BCIM-3 (3.6170 g, 7.652 mmol, 23.6%) was obtained as a clear, colorless viscous liquid. $^1$H NMR analysis was consistent with the desired product.

Nanoparticle Fillers Functionalized with 3-Methacryloxy Propyl Trimethoxysilane

Functionalized silica nanoparticles were prepared having the components shown in Table 2 as previously described. The final wt. % solids of EX NP-2 was measured to be approximately 46.6%.

Hardcoats Prepared from CBIM-1

Hard coat solutions were prepared by combining the methoxy propanol solution of functionalized silica nanoparticles from Example NP-2 (Table 2), pentaerythritol triacrylate, IRG651 in the amounts shown in Table 11 in a 20 mL glass vial. Methoxy propanol was added to bring the weight percent solids of the solution to 50 percent. The solutions were mixed well and sonicated for 2-5 minutes.

TABLE 11

| Hardcoat Formulations with BCIM-1 | | | | | |
|---|---|---|---|---|---|
| Component | % solids | G (Control) | H | I | J |
| Nanoparticle composition of EX NP-2, g | 46.58 | 5.367 | 5.367 | 5.367 | 5.367 |
| BCIM-1, g | 100 | 0 | 0.106 | 0.170 | 0.191 |
| Pentaerythritol Triacrylate, g | 100 | 2.450 | 2.344 | 2.280 | 2.258 |
| IRG651, g | 100 | 0.05 | 0.05 | 0.05 | 0.05 |
| Additional Methoxy Propanol, g | | 2.133 | 2.133 | 2.133 | 2.133 |

The solutions were coated onto 6 inch×14 inch (15 cm×35 cm) sheets of 5 mil (0.13 mm) thick PET film (prepared as described in Example 29 of U.S. Pat. No. 6,893,731 (Kausch), using a #10 wire-wound rod with a 0.5 inch (1.3 cm) diameter (obtained from RD Specialties, Webster, NY). The coated samples were dried in an oven set at 75° C. for 30 minutes. The coated films were then cured by irradiating with UV light (884 mJ/cm$^2$, UVB) using a UV processor (Fusion UV System, Inc., Gaithersburg, MD) equipped with an H-bulb and operated under nitrogen atmosphere at a line speed of 24 feet/min (2 passes) to provide hard coats on the PET film.

After irradiation, the coated films were measured for film curl, hard coat thickness, and pencil hardness. Results are shown in Tables 12, 13, and 14. The film curl was measured on a 7.6 cm×7.6 cm square sample that was cut from the center of a coated film. The sample was placed on a flat surface, and the height of each corner was measured using a ruler. The total curl was determined by summing the height of the four corners.

The film thickness was measured at each corner of the 7.6 cm×7.6 cm square and in the middle of each side (eight measurements total) using a dial gage (Mitutoyo Digital Dial Gauge, Model ID-F125E, Mitutoyo Corp.; Aurora, IL). The average film thickness was calculated using these eight measurements.

The pencil hardness was measured on each hard coat using an Elcometer 3086 motorized pencil hardness tester (obtained from Elcometer Inc. of Rochester Hills, MI) with a 7.5 N load following ASTM D3363.

TABLE 12

Hardcoat Curl (BCIM-1)

| Example | G (Control) | H | I | J |
|---|---|---|---|---|
| Corner Heights, mm | 1.5 | 2.0 | 1.0 | 1.5 |
| | 15.5 | 13.0 | 9.0 | 7.0 |
| | 1.5 | 1.5 | 1.0 | 2.0 |
| | 14.0 | 12.5 | 9.0 | 7.5 |
| Total corner height, mm | 32.5 | 29.0 | 20.0 | 18.0 |
| Relative to Control | 100 | 89.23 | 61.54 | 55.38 |

TABLE 13

Hardcoat Thickness (BCIM-1)

| Example | G (Control) | H | I | J |
|---|---|---|---|---|
| Average Thickness, micrometers | 8.6 | 8.8 | 8.6 | 8.4 |
| SD, micrometers | 0.5 | 0.5 | 0.5 | 0.5 |
| Relative to Control, % | 100 | 101.4 | 100 | 97.1 |

TABLE 14

Hardcoat Pencil Hardness (BCIM-1)

| Example | G (Control) | H | I | J |
|---|---|---|---|---|
| Hardness | 3H | 3H | 3H | 3H |

Preparation of Hydroxy Bis-Cyclic Imide-1 (HBCIM-1)—Reaction Scheme 8

An amber glass bottle equipped with a magnetic stir bar is to be charged with 3,3-dimethyl-5-methylene-tetrahydropyran-2,6-dione (anhydride 2) and 1,3-diamino-2-propanol (0.5 equivalent of the anhydride 2). The two charged components will be mixed well using a wooden applicator. The bottle is then sealed with a Teflon-lined plastic cap. With stirring, the mixture is heated to 125° C. in an oil bath. After 4 hours, the reaction will be removed from the oil bath, the cap removed, and the reaction mixture will be allowed to cool to room temperature open to the atmosphere. The crude product mixture will then be purified by filtering twice through a plug of silica gel (approximately 4 centimeters wide by 10 centimeters tall) using a 50:50 mixture of hexane and ethyl acetate as eluent to provide the desired hydroxy bis-cyclic imide product, HBCIM-1.

Preparation of Methacrylated Hydroxy Bis-Cyclic Imide-1 (MA-BCIM-1)—Reaction Scheme 9

A glass jar is to be charged with HBCIM-1 and a 1 equivalent IEM. The components will be hand mixed using a wooden applicator. BHT (400 parts per million with respect to the total jar contents) and dibutyltin dilaurate catalyst (DBTDL, 0.5 wt %) will then be added to the jar followed by hand mixing. The jar will be left at room temperature for 30 minutes with hand mixing every 10 minutes. The jar will then be placed in an oven at 60° C. for 1 hour with hand mixing the components every 10-15 minutes to give the desired product MA-BCIM-1.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A polymerizable composition comprising:
   at least one monomer, oligomer, polymer, or a combination thereof comprising ethylenically unsaturated groups; and
   at least one cyclic imide monomer comprising an α, β-unsaturated carbonyl having a structure selected from

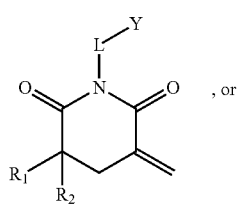

i) , or

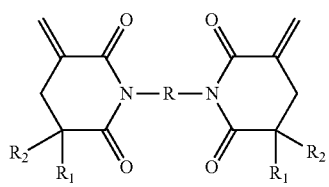

ii)

wherein L is a covalent bond or organic linking group;
Y is alkyl, aryl, hydroxyl, carboxylic acid, or an ethylenically unsaturated group;
R is an organic linking group; and
$R_1$ and $R_2$ are independently substituents and not hydrogen.

2. The polymerizable composition of claim 1 wherein $R_1$ and $R_2$ are substituents such that the cyclic imide monomer ring-opens during polymerization thereby forming radicals including C1 to C4 alkyl groups.

3. The polymerizable composition of claim 1 wherein L is (hetero)alkylene or (hetero)arylene.

4. The polymerizable composition of claim 1 wherein Y is carboxylic acidic group or a (meth)acrylate group.

5. The polymerizable composition of claim 1 wherein L comprises at least one hydroxyl group.

6. The polymerizable composition of claim 1 wherein the cyclic imide monomer comprises at least two cyclic imide groups.

7. The polymerizable composition of claim 1 wherein R is (hetero)alkylene or (hetero)arylene, optionally comprising at least one pendent ethylenically unsaturated polymerizable group.

8. The polymerizable composition of claim 1 wherein the polymerizable composition comprises at least one monomer comprising two or more ethylenically unsaturated polymerizable groups.

9. The polymerizable composition of claim 8 wherein the ethylenically unsaturated polymerizable groups are (meth)acryl groups.

10. The polymerizable composition of claim 1 wherein the polymerizable composition further comprises an inorganic particulate material including nanoparticles having a particle size of less than 1 micron.

11. The polymerizable composition of claim 1 wherein the polymerizable composition comprises one or more free radical initiator selected from thermal initiators, photoinitiators.

12. The polymerizable composition of claim 9 wherein the polymerizable composition is a hardcoat composition having a pencil hardness of at least 3H after curing the polymerizable composition.

13. A composition comprising:
polymerized units having the structure:

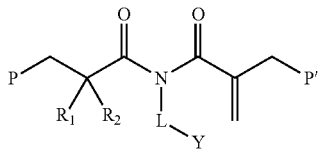

wherein L is a covalent bond or a linking group;
Y is alkyl, aryl, hydroxyl, carboxylic acid, or an ethylenically unsaturated group;
$R_1$ and $R_2$ are independently substituents and not hydrogen; and
P and P' are independently polymerized units of an ethylenically unsaturated polymerizable monomer, oligomer, polymer, or combination thereof.

14. A cyclic imide monomer comprising an α, β-unsaturated carbonyl having a structure selected from

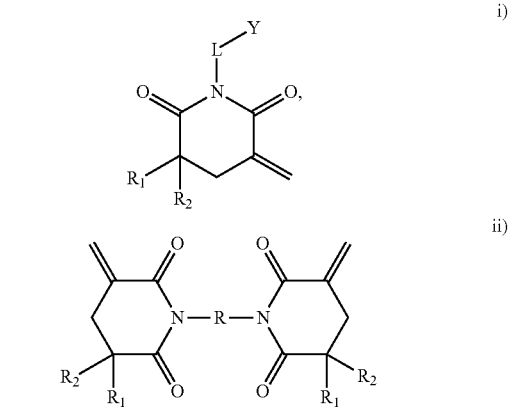

wherein L is a covalent bond or organic linking group;
Y is alkyl, aryl, hydroxyl, carboxylic acid, or an ethylenically unsaturated group;
R is an organic linking group; and
$R_1$ and $R_2$ are independently substituents and not hydrogen.

* * * * *